US008521774B1

(12) United States Patent
Cai et al.

(10) Patent No.: US 8,521,774 B1
(45) Date of Patent: Aug. 27, 2013

(54) DYNAMICALLY GENERATING PRE-AGGREGATED DATASETS

(75) Inventors: Chao Cai, San Jose, CA (US); Eric W. Ewald, Gilroy, CA (US); Cameron M. Tangney, Sunnyvale, CA (US); Sagnik Nandy, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 75 days.

(21) Appl. No.: 12/860,328

(22) Filed: Aug. 20, 2010

(51) Int. Cl.
*G06F 17/30* (2006.01)

(52) U.S. Cl.
USPC .......................................... 707/776

(58) Field of Classification Search
None
See application file for complete search history.

(56) References Cited

U.S. PATENT DOCUMENTS

| | | | | |
|---|---|---|---|---|
| 5,870,746 | A * | 2/1999 | Knutson et al. ........................ | 1/1 |
| 6,334,110 | B1 | 12/2001 | Walter et al. | |
| 6,430,545 | B1 * | 8/2002 | Honarvar et al. ............... | 706/47 |
| 6,615,258 | B1 * | 9/2003 | Barry et al. .................... | 709/223 |
| 7,085,682 | B1 | 8/2006 | Heller et al. | |
| 7,318,056 | B2 | 1/2008 | Taniguchi et al. | |
| 8,037,062 | B2 * | 10/2011 | Baris et al. .................... | 707/723 |
| 2002/0091707 | A1 * | 7/2002 | Keller ......................... | 707/104.1 |
| 2003/0120670 | A1 | 6/2003 | Nareddy et al. | |
| 2004/0003132 | A1 * | 1/2004 | Stanley et al. ................ | 709/316 |
| 2004/0204990 | A1 | 10/2004 | Lee et al. | |
| 2005/0021397 | A1 | 1/2005 | Cui et al. | |
| 2005/0055269 | A1 | 3/2005 | Roetter et al. | |
| 2005/0071218 | A1 | 3/2005 | Lin et al. | |
| 2005/0165889 | A1 | 7/2005 | Muret et al. | |
| 2005/0216421 | A1 * | 9/2005 | Barry et al. .................... | 705/64 |
| 2005/0222901 | A1 | 10/2005 | Agarwal et al. | |
| 2007/0078707 | A1 | 4/2007 | Axe et al. | |
| 2007/0156514 | A1 | 7/2007 | Wright et al. | |
| 2007/0156718 | A1 * | 7/2007 | Hossfeld et al. ............... | 707/100 |
| 2007/0260512 | A1 | 11/2007 | Sattley et al. | |
| 2008/0103892 | A1 | 5/2008 | Chatwin et al. | |
| 2008/0243592 | A1 | 10/2008 | Song et al. | |
| 2008/0300974 | A1 | 12/2008 | Bhandari et al. | |
| 2009/0100360 | A1 * | 4/2009 | Janzen et al. ................. | 715/764 |
| 2010/0023503 | A1 * | 1/2010 | Baris et al. ........................ | 707/5 |
| 2010/0082691 | A1 * | 4/2010 | Jaster et al. ................... | 707/792 |
| 2010/0198680 | A1 | 8/2010 | Ma et al. | |
| 2011/0054860 | A1 * | 3/2011 | Guild et al. ....................... | 703/2 |
| 2011/0055149 | A1 * | 3/2011 | Pimpale et al. ............... | 707/602 |
| 2011/0231239 | A1 | 9/2011 | Burt et al. | |

OTHER PUBLICATIONS

Notification Concerning Transmittal of International Preliminary Report on Patentability for PCT/US2010/054923 mailed on Oct. 4, 2012, 8 pages.

\* cited by examiner

*Primary Examiner* — Bai D. Vu
(74) *Attorney, Agent, or Firm* — Fish & Richardson P.C.

(57) ABSTRACT

Methods, systems, and apparatus, including computer programs encoded on a computer storage medium, for dynamically generating and configuring pre-aggregated datasets optimized for responding to particular types of data requests made against a large sub-optimal multidimensional dataset are disclosed. A dynamic aggregator monitors the query types and response latencies associated with queries made against the large multidimensional dataset. The dynamic aggregator defines pre-aggregated datasets based on the types of queries received from users and calculates a respective benefit score for each pre-aggregated dataset. The benefit score of each pre-aggregated dataset can be based on the recorded latencies and query count for the pre-aggregated dataset. The dynamic aggregator can decide whether to generate and/or maintain particular pre-aggregated datasets based on the current values of the benefit scores associated with the particular pre-aggregated datasets.

18 Claims, 12 Drawing Sheets

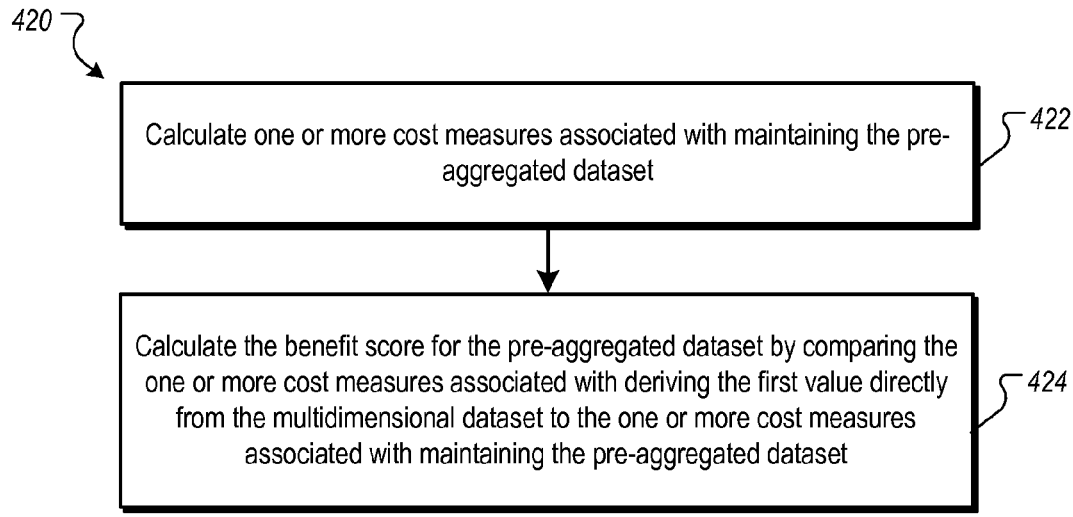

DYNAMICALLY GENERATING PRE-AGGREGATED DATASETS

BACKGROUND

This specification relates to electronic data mining and reporting.

The Internet provides access to a wide variety of resources (e.g., images, video and/or audio files, search engines, news portals, gaming websites, social networking sites, as well as individual web pages pertaining to particular subjects). Access to these resources presents opportunities for advertisements to be provided with the resources. For example, a web page can include advertisement slots in which advertisements can be presented. Advertisement slots can be allocated to selected advertisers based on various matching criteria (e.g., keywords, bids, geographic region, time, etc.). Advertisements from the selected advertisers can be presented in the advertisements slots when the webpage is accessed by a consumer.

An advertising management system can be used to facilitate the value exchange between advertisers and publishers (e.g., search engines, web content publishers). For example, advertisers can use advertising management tools to create and manage various aspects of their advertising campaigns using campaign parameters such as ad groups, keywords, targeting criteria, budgets, bids for ad placement, delivery periods, advertisement types, and so on. After an advertiser has specified the campaign parameters and activated the advertising campaigns, advertisements can be dynamically selected and served on publishers' webpages according to the various campaign parameters specified by the advertiser. The advertisers can also track the performance of their ad campaigns through the advertising management system. Performance metrics (e.g., number of conversions, impressions, clicks, conversion revenue, and so on) related to various aspects of the ad campaign (e.g., ad groups, targeting criteria, bids, keywords, advertisements, content matching methods, and so on) can be provided to the advertisers periodically or upon request. The advertisers can rely on the performance metrics to determine whether and how to effectively adjust settings of various aspects of their ad campaigns to improve the performance of ad campaigns.

SUMMARY

In general, one innovative aspect of the subject matter described in this specification can be embodied in methods that include the actions of: receiving a first data request from a user device, the first data request specifying a first type of aggregated data being requested and one or more first criteria for selecting data from a multidimensional dataset to derive a first value for the first type of aggregated data; responding to the first data request, where the action of responding includes: deriving the first value for the first type of aggregated data using the data selected from the multidimensional dataset according to the one or more first criteria; and recording a respective latency associated with the deriving of the first value. The methods further include the actions of: defining a pre-aggregated dataset based on the first data request, the pre-aggregated dataset including pre-aggregated values derived from the multidimensional dataset and enabling improved performance in deriving values for the first type of aggregated data as compared to the multi-dimensional dataset; calculating a benefit score for the pre-aggregated dataset based on one or more cost measures associated with deriving the first value directly from the multidimensional dataset, the one or more cost measures including the recorded latency associated with the deriving of the first value; determining that the benefit score meets a predetermined threshold value; and generating the pre-aggregated dataset from the multidimensional dataset upon determining that the benefit score of the pre-aggregated dataset meets the predetermined threshold value.

These and other embodiments can each optionally include one or more of the following features.

In some implementations, the action of calculating the benefit score for the pre-aggregated dataset further includes the actions of: calculating one or more cost measures associated with maintaining the pre-aggregated dataset; and calculating the benefit score for the pre-aggregated dataset by comparing the one or more cost measures associated with deriving the first value directly from the multidimensional dataset to the one or more cost measures associated with maintaining the pre-aggregated dataset.

In some implementations, the one or more cost measures associated with deriving the first value directly from the multidimensional dataset further includes a recorded resource usage for the first deriving, and the one or more cost measures associated with maintaining the pre-aggregated dataset includes amounts of resources necessary for storing and maintaining the pre-aggregated dataset.

In some implementations, the methods further include actions of: receiving a second data request, the second data request specifying a type of aggregated data being requested and one or more criteria for selecting data from the multidimensional dataset to derive a value for the requested type of aggregated data in the second data request; determining whether the pre-aggregated dataset would enable improved performance in deriving the value for the requested type of aggregated data in the second data request as compared to the multi-dimensional dataset; and increasing the benefit score for the pre-aggregated dataset upon a determination that the pre-aggregated dataset would enable improved performance in deriving the value for the requested type of aggregated data in the second data request as compared to the multi-dimensional dataset. In some implementations, the action of determining that the benefit score meets a predetermined threshold value is based on the increased benefit score.

In some implementations, the methods further include the actions of: after generating the pre-aggregated dataset, receiving a second data request, the second data request specifying a type of aggregated data being requested and one or more criteria for selecting data from the multidimensional dataset to derive a value for the requested type of aggregated data in the second data request; determining whether the pre-aggregated dataset would enable improved performance in deriving the value for the requested type of aggregated data in the second data request as compared to the multi-dimensional dataset; deriving the value for the type of aggregated data in the second data request using the pre-aggregated data from the pre-aggregated dataset upon determination that the value for the requested type of aggregated data in the second data request can be derived from the pre-aggregated values in the pre-aggregated dataset; and providing the value derived from the pre-aggregated dataset to a requesting user device of the second data request.

In some implementations, the methods further include the actions of: updating the pre-aggregated dataset using data newly added to the multidimensional dataset; determining one or more cost measures associated with maintaining the pre-aggregated dataset based on resources used for updating the pre-aggregated dataset and storing the updated pre-aggregated dataset; and decreasing the benefit score for the pre-aggregated dataset based on the recorded cost measures associated with maintaining the pre-aggregated dataset.

In some implementations, the methods further include the action of: determining that the decreased benefit score is below the predetermined threshold value; and discarding the pre-aggregated dataset upon determining that the decreased benefit score is below the predetermined threshold value.

In general, another aspect of the subject matter described in this specification can be embodied in methods that include the actions of: monitoring data requests received from user devices, each data request specifying a respective type of aggregated data being requested and one or more respective criteria for selecting data from a multidimensional dataset to derive a respective value for the requested type of aggregated data; based on the received data requests, defining one or more optimized datasets each adapted for deriving the respective value for the requested type of aggregated data of at least one of the received data requests and enabling improved performance in value derivation for the requested type of aggregated data as compared to the multi-dimensional dataset; maintaining a respective request count for each of the optimized datasets, the respective count tallying the received data requests for which the optimized dataset is adapted to provide improved performance in value derivation as compared to the multidimensional dataset. The methods further include, upon receipt of each of the data requests: (I) determining whether a respective optimized dataset has been generated for the requested type of aggregated data specified in the data request; (II) if the respective optimized dataset has not been generated: deriving the respective value for the requested type of aggregated data specified in the data request based on the data selected directly from the multidimensional dataset; recording one or more cost measures associated with the deriving of the respective value from the multidimensional dataset; and calculating a benefit score for the respective optimized dataset based on the one or more cost measures and the respective request count maintained for the optimized dataset; (III) if the respective optimized dataset has been generated: deriving the respective value for the requested type of aggregated data specified in the data request based on data selected from the optimized dataset. The methods further includes the actions of: determining that the respective benefit score of at least one of the optimized datasets has exceeded a pre-determined threshold value; and generating the at least one of the optimized datasets upon determining that the respective benefit score of at least one of the optimized datasets has exceeded a pre-determined threshold value.

These and other embodiments can each optionally include one or more of the following features.

In some implementations, the methods further include, for each of the optimized datasets that are already generated: updating the optimized dataset using data newly added to the multidimensional dataset; determining one or more cost measures for maintaining the optimized dataset based on resources used for updating the optimized dataset and storing the updated optimized dataset; decreasing the respective benefit score for the respective optimized dataset based on the recorded cost measures for maintaining the optimized dataset; determining that the decreased benefit score is below the predetermined threshold; and discarding the respective optimized dataset upon determining that the respective benefit score of the optimized dataset is below the predetermined threshold.

In some implementations, the methods further include: upon receipt of each of the data requests, if the respective optimized dataset has been generated, determining one or more cost measures associated with the second deriving based on time and resources used for the second deriving; decreasing the benefit score for the respective optimized dataset based on the recorded one or more cost measures associated with the second deriving; determining that the decreased benefit score is below a second predetermined threshold; and splitting the optimized datasets into one or more smaller optimized datasets upon determining that the decreased benefit score is below the second pre-determined threshold.

In general, another aspect of the subject matter described in this specification can be embodied in methods that include the actions of: monitoring respective query types and response times associated with queries made against a multidimensional dataset, each query being received from a user of the multidimensional dataset; defining one or more pre-aggregated datasets based on the query types of the received queries, each pre-aggregated dataset including pre-aggregated values derived from the multidimensional dataset and enabling improved response time for an associated query type as compared to the multi-dimensional dataset; dynamically updating a respective benefit score for each of the one or more pre-aggregated datasets based on a current count and recorded response times associated with the receive queries that are of the associated query type of the pre-aggregated dataset; and generating at least one of the pre-aggregated datasets from the multidimensional dataset upon determination that the respective benefit score of the at least one pre-aggregated dataset meets a predetermined threshold value.

These and other embodiments can each optionally include one or more of the following features.

In some implementations, the action of defining the one or more pre-aggregated datasets based on the query types of the received queries further include: recording data ranges and dimensions of the multidimensional dataset that were accessed during preparation of the respective response for each of the received queries; recording types of data aggregation performed during preparation of the respective response for each of the received queries; analyzing the recorded data ranges and dimensions that were accessed and the recorded types of data aggregations that were performed for each type of received queries; and preparing a respective definition for the pre-aggregated dataset for each type of received queries based on a result of the analyzing, wherein the pre-aggregated dataset prepared according to the definition including values derived using at least some of the recorded types of data aggregation and performed on at least some of the recorded data ranges and dimensions.

In some implementations, each query type specifies a type of performance metric calculated by aggregating data in one or more dimensions of the multidimensional dataset. In some implementations, each query type specifies respective values or value ranges for one or more dimensions of the multidimensional dataset that are used to select data from the multidimensional dataset for calculating a type of performance metric. In some implementations the type of performance metric includes one of a count of a specified type of user interaction events, a financial value associated with a specified type of user interaction events, and a time value associated with a specified type of user interaction events.

In some implementations, the one or more dimensions includes one or more of an advertiser identifier, a user identifier, an ad campaign identifier, an ad group identifier, a keyword, a creative identifier, a delivery period, a conversion event, a click event, an impression event, a search event, a bid value, a conversion value, and a timestamp.

In some implementations, features from different embodiments described above may be combined. In some implementations, not all features are necessary.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages.

Advertisers' requests for performance reports can be expressed in terms of queries made against a large multidimensional dataset that include data representing various user interaction events (e.g., impressions, clicks, and conversions) and data providing context of the user interaction events. Each query can specify a type of performance metric that is being requested, and one or more selection criteria that can be used to select data from the multidimensional dataset to derive the value(s) for the requested type of performance metric.

Respective pre-aggregated datasets that would enable improved query response time can be defined for different types of queries that have been made against the multidimensional dataset. Before a pre-aggregated dataset is actually generated to realize the improved response time for future queries, the potential benefit of the pre-aggregated dataset can be determined by monitoring the receipt and response times for queries of an associated query type of the pre-aggregated dataset. The potential benefit of the pre-aggregated dataset can be determined based on the frequency that the associated type of queries are received and the latencies associated with responding to the queries using data directly retrieved from the multidimensional dataset. A pre-aggregated dataset can be generated when it has been determined that the potential benefit of the pre-aggregated dataset outweighs the cost of maintaining the pre-aggregated dataset.

By continuously monitoring and analyzing the queries received from users of the large multidimensional dataset, a dynamic aggregator of an advertising management system can timely determine which types of performance metrics are in high demand at a particular time and what kinds of data pre-aggregation would help reduce the response time for the types of performance metrics that are in high demand. The potential benefit for each type of data pre-aggregation can be determined based on the actual demand of the users instead of heuristic projections made by human administrators of the multidimensional dataset.

Furthermore, the dynamic aggregator can optimize the configurations (e.g., sizes, organization, pre-aggregated values, dimensions, value ranges of the dimensions, frequency of updates, and so on) of the pre-aggregated datasets based on the actual demand of the users instead of heuristic projections made by human administrators of the multidimensional dataset.

The dynamic aggregator can quickly and continually identify new trends in the user demand and timely respond to the changed demand with newly defined/configured pre-aggregated datasets without active manual intervention.

In addition, by automating the process for configuring and generating pre-aggregated datasets based on actual queries received from users, a wider variety of pre-aggregated datasets can be defined and configured that are better tailored to the specific needs of individual users, as compared to manual definition and configurations of the pre-aggregated datasets. At the same time, the speed by which new pre-aggregated datasets are defined and configured can be improved as well.

The dynamic aggregator's decisions to generate and maintain particular pre-aggregated datasets can also take into account the respective amount of potential and actual performance improvements (e.g., latency reduction) that would result from the use of the particular pre-aggregated datasets, as well as the cost of storing and updating the particular pre-aggregated datasets. The benefit scores of the pre-aggregated datasets can be used to balance the demand for and the performance improvements enabled by each pre-aggregated dataset against the cost associated with maintaining the pre-aggregated dataset. As a result, an efficient set of pre-aggregated datasets can be maintained using a given amount of available resources.

In some implementations, the dynamic aggregator can also record the latencies associated with accessing and processing data from an existing pre-aggregated dataset when responding to particular types of queries associated with the existing pre-aggregated dataset. As the pre-aggregated dataset grows in size and complexity over time due to new data entries being added, the latencies associated with accessing and processing data from the existing pre-aggregated dataset would also increase over time.

The dynamic aggregator can define additional, smaller pre-aggregated dataset based on the existing pre-aggregated dataset and decide when to split the existing pre-aggregated dataset into the smaller pre-aggregated datasets based the growing latencies associated with the existing pre-aggregated dataset. As a result, a reasonable response time can be continually maintained even as available data grows over time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4B is a flow diagram of an example process for calculating a benefit score for a pre-aggregated dataset.

FIG. 4C is a flow diagram of an example process for updating the benefit score for a pre-aggregated dataset based on a query count associated with the pre-aggregated dataset.

Like reference numbers and designations in the various drawings indicate like elements.

DETAILED DESCRIPTION

Overview

Figure 1:
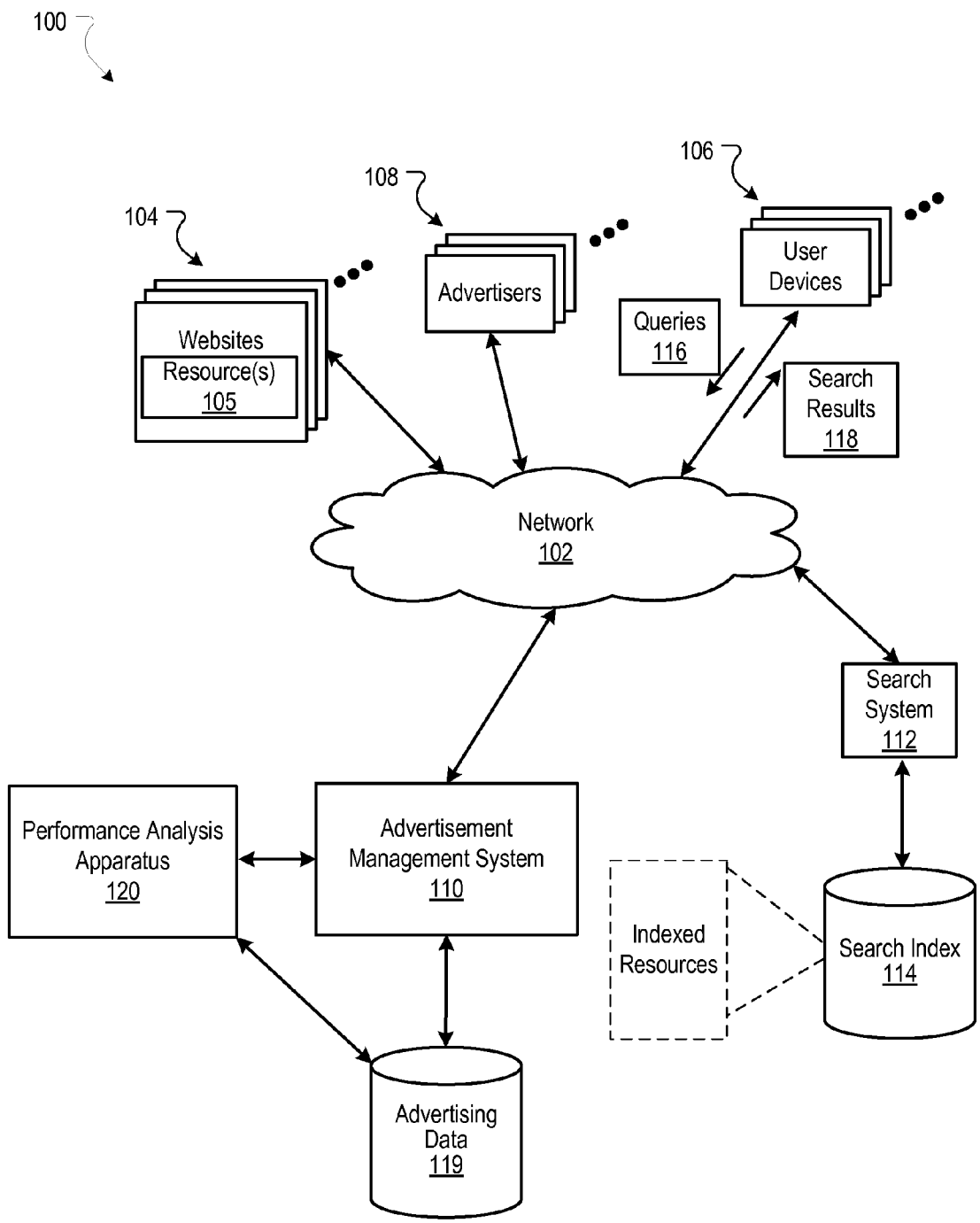
FIG. 1 is a block diagram of an example environment in which an advertisement management system manages advertising services.

In a system where an immense amount of data are stored and only a much smaller subset of the data are needed at a time to satisfy a particular information need, storing the data in a manner that facilitates efficient retrieval and processing of selected subsets of the stored data can improve the efficiency of the system. In addition, as the large amount of data are likely distributed among a large number of data servers, a data storage model that enable efficient parallel processing of the distributed data on different data servers can increase quality and responsiveness of the information service.

An example distributed data storage model can be implemented as a sparse, loosely distributed, persistent multi-dimensional sorted map. The map can be indexed by a row key, a column key, and a timestamp. An administrator of the distributed data storage model can create schemas for the row key and/or column keys such that desired data locality can emerge in the distributed data storage model when key values are generated according to the schemas. Each cell of a data table implemented according to the example distributed data storage model can store different versions of the same data as indexed by the timestamp. Although the timestamp values can be actual time values associated with the data, in certain applications, other properties associated with the data can also be used as timestamps to distinguish the different data entities stored in each cell.

The above example distributed data storage model is suitable for parallel processing of the data stored therein. A data table implemented according to the example distributed data storage model can serve as either input or output to a distributed data processing system. An example of a distributed data processing system can be implemented according to a MapReduce framework. However, other suitable distributed data processing systems may be used as well. Other distributed data storage models are also possible.

A data table implemented according to the example distributed data storage model can be used to store a large multidimensional dataset of an online advertising management system. The large multidimensional dataset includes data representing user interaction events (e.g., impressions, clicks, and conversions) and data characterizing the context of the user interaction events (e.g., time, location, associated advertisement, etc.). The user interaction data in the multidimensional data set can be used to derive values of various advertising performance metrics and the performance metrics can be provided to advertisers upon request.

Even though the data tables implemented according to the distributed data storage model enables parallel processing and scalability, as the size of the multidimensional dataset continue to grow, the speed by which a requested performance metric can be derived and presented can slow down significantly.

Sometimes, it is desirable to anticipate the type of performance metrics that are most likely to be requested, and replicate selected subsets of the data in the multidimensional dataset in a fast access storage device (e.g., a persistent data cache), such that values for performance metrics in high demand can be obtained more quickly.

Sometimes, it is desirable to process subsets of the data in the multidimensional dataset to derive particular intermediate values (e.g., pre-aggregated values in one or more dimensions), such that the particular intermediate values can be used to derive the values for the performance metrics in high demand. The particular intermediate values can be stored as a pre-aggregated dataset, for example, in a fast access storage device. The pre-aggregated dataset can be stored in a data table implemented according to the example distributed data storage model as well.

Although it is possible to project which types of performance metrics may be in high demand and which data ranges would likely be of interest to users based on manual analysis of a collection of historic queries made against the multidimensional dataset, such manual analysis is time-consuming and labor-intensive. After a pre-aggregated dataset has been generated based on the manual analysis, subsequent tuning and configuring of the pre-aggregated dataset can still be difficult and time-consuming.

In addition, since it is costly to maintain a pre-aggregated dataset (e.g., due to storage and processing power constraints), it is desirable to balance the cost of maintaining the pre-aggregated dataset against the performance improvement that the pre-aggregated dataset can enable both before the pre-aggregated dataset is generated and during subsequent maintenance of the pre-aggregated dataset.

In some implementations, the performance improvement enabled by a pre-aggregated dataset is correlated with the latencies associated with responding to queries by processing data directly retrieved from the multidimensional dataset. In a system where the decision to generate and maintain a pre-aggregated dataset is based on manual analysis of historic queries or conjecture, the decision may neglect to take into account of the respective latencies associated with responding to different types of queries directly using data from the multidimensional dataset. As a result, a less efficient collection of pre-aggregated dataset may be generated and maintained using a given amount of resources.

As described herein, a dynamic aggregator component can be implemented to monitor the queries made against the large multidimensional dataset. The dynamic aggregator analyzes the queries received from the users (e.g., advertisers) and defines a respective pre-aggregated dataset for each different type of queries that has been received. The dynamic aggregator can also record the respective latency associated with directly accessing and processing data in the large multidimensional dataset when responding to each received query.

The dynamic aggregator can calculate a respective benefit score for each pre-aggregated dataset. The benefit score of each pre-aggregated dataset can be based on the recorded latencies for directly using data from the multidimensional dataset to respond to the associated queries of the pre-aggregated dataset, where the associated queries of the pre-aggregated dataset are the group of received queries based on which the pre-aggregated dataset has been defined.

The dynamic aggregator can further dynamically update the benefit score of a pre-aggregated dataset according to the frequency (or query count per given time period) at which the dataset's associated type of queries is received. The dynamic aggregator can decide whether to generate and/or maintain particular pre-aggregated datasets based on the current values of the benefit scores associated with the particular pre-aggregated datasets.

By continuously monitoring and analyzing the queries received from users of the large multidimensional dataset, the dynamic aggregator can timely determine which types of performance metrics are in high demand at a particular time and what kinds of data pre-aggregation would help reduce the response time for the types of performance metrics that are in high demand.

Furthermore, the dynamic aggregator can optimize the configurations (e.g., sizes, pre-aggregated values, dimensions, value ranges of the dimensions, frequency of updates, and so on) of the pre-aggregated datasets based on the actual demand of the users instead of heuristic projections made by human administrators of the multidimensional dataset.

The benefit scores of the pre-aggregated datasets can be used to balance the demand for and the performance improvements enabled by each pre-aggregated dataset against the cost associated with maintaining the pre-aggregated dataset.

Although examples are given in the context of performance metrics in an online advertising context, the dynamic generation of pre-aggregated datasets from a large multi-dimensional dataset can be applied to other contexts as well. For example, the multidimensional dataset can be used to store user interaction data (e.g., data describing user visits, page views, user submissions, voting) made with respect to a dynamic website (e.g., a news website, an online forum website). Data pre-aggregation may be used to improve the response time for generating performance metrics (e.g., revenue, visit count, download count, user ratings, etc.) related to various aspects of the website (e.g., update frequency, topic category, language, level of access, cost of access, etc.) and/or various aspects of the user interactions (e.g., geographic location, time, etc.).

In addition, although data pre-aggregation is described as one method of creating an optimized dataset that would enable improvement performance in responding to queries made against a multidimensional dataset, other methods of creating optimized datasets are possible, such as reorganizing a subset of the multidimensional dataset in a different data model or storing the duplicating the subset of data in a fast access storage device.

Furthermore, the term "optimized dataset" as used herein refers to a dataset that is different from a baseline dataset (e.g., a multidimensional dataset) from which the "optimized dataset" is generated, and that would result in some degree of performance improvement for a given purpose as compared to the baseline dataset. As used herein, the term "optimized" is a relative term and does not necessarily denote a highest possible degree of performance improvement.

An Example Online Advertising Environment

FIG. 1 is a block diagram of an example environment 100 in which an advertisement management system 110 manages advertising services. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 (e.g., text, images, multimedia content, and programming elements, such as scripts) associated with a domain name and hosted by one or more servers. Each website 104 is maintained by a publisher, which is an entity that controls, manages, and/or owns the website 104.

A user device 106 is an electronic device that is under the control of a user and is capable of requesting and receiving resources over the network 102. Examples of user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying an ad slot in which advertisements can be presented.

To facilitate searching of online resources, the environment 100 can include a search system 112 that identifies the resources by crawling and indexing the resources provided by the publishers on the websites 104. User devices 106 can submit search queries 116 to the search system 112 over the network 102. In response, the search system 112 accesses the search index 114 to identify resources that are relevant to the search query 116. The search system 112 returns links to the identified resources as search results to the user devices 106 in search results pages 118. Search results pages 118 can also include one or more advertisement slots in which advertisements can be presented.

When a resource 105 or search results 118 are requested by a user device 106, the advertisement management system 110 receives a request for advertisements to be provided with the resource 105 or search results 118. The request for advertisements can include characteristics of the advertisement slots (e.g., size, web address of the resource, media type of the requested advertisement, etc.) that are defined for the requested resource or search results page, and can be provided to the advertisement management system 110.

Similarly, keywords (i.e., one or more words that are associated with content) associated with a requested resource ("resource keywords") or a search query 116 for which search results are requested can also be provided to the advertisement management system 110 to facilitate identification of advertisements that are relevant to the resource or search query 116.

Based on data included in the request for advertisements, the advertisement management system 110 can identify advertisements that are eligible to be provided in response to the request. For example, eligible advertisements can have characteristics matching the characteristics of advertisement slots and have targeting keywords that match the specified resource keywords or search queries 116. Advertisers may specify a level of match (e.g., exact match, phrase match, or broad match, for example) that is required for the advertisement distribution.

The advertisement management system 110 can further select a subset of the eligible advertisements for presentation in the advertisement slots of a requested resource or search results page based on results of an auction. For example, the advertisement management system 110 can receive bids from advertisers and allocate the advertisement slots to the bidders with the highest auction scores at the conclusion of the auction. Other factors (e.g., ad quality) can be taken into consideration in the ad selection process as well.

When an advertisement is provided to a user in an advertisement slot, user interaction data representing an impression of the advertisement can be recorded and stored in the advertising data store 119. When the presented advertisement is selected (e.g., "clicked on") by the user viewing the advertisement, user interaction data representing a click of the advertisement can be recorded and stored in the advertisement data store 119. When the user subsequently performs a prescribed act (e.g., makes a purchase, or signs up for a newsletter, etc.) on a landing page of the advertiser website, user interaction data representing a conversion can be stored in the advertising data store 119 as well.

As used throughout this document, user interactions include any presentation of content to a user and any subsequent affirmative actions or non-actions (collectively referred to as "actions" unless otherwise specified) that a user takes in response to presentation of content to the user (e.g., selections of the content following presentation of the content, or no selections of the content following the presentation of the content). Thus, a user interaction does not necessarily require a selection (i.e., click) of the content (or any other affirmative action) by the user.

User interaction data representing each user interaction (e.g., impression, click, or conversion) can be stored in association with other data characterizing the surrounding context of the user interaction, such as a time, a location, an advertiser identifier, a user identifier (e.g., a cookie identifier), a creative identifier, a resource identifier, a search query, a user interaction type, a web address of the landing page, and so on. The collection of user interaction data can be enabled through a user opt-in procedure and any personally identifiable information are removed during subsequent use and distribution of the user interaction data.

Each advertiser 108 can create one or more advertising campaigns using various campaign parameters that are used to control distribution of the advertiser's advertisements. Each advertising campaign can include one or more ad groups that have modified campaign parameters that are specific to the ad group. Examples of campaign parameters can include targeting keywords and corresponding bids, geographic or demographic targeting criteria, delivery period, content network, keyword match type, as well as other parameters corresponding to one or more advertisements. Parameters related to an advertisement can include, for example, creative identifier, creative name, ad type, size, first line, web address of the landing page, display URL, media type, and so on.

The advertisers 108 can define and activate advertising campaigns through an interface of the advertisement management system 110. The campaign parameters can be stored in the advertising data store 119 under a respective advertiser's account. The campaign parameters of an existing advertising campaign can be subsequently modified through the user interface of the advertising management system 110.

Example Performance Reporting

The advertisers 108 can also access the advertisement management system 110 to monitor performance of the active advertising campaigns and the advertisements that are distributed using the campaign parameters. For example, an advertiser can access a performance report that provides values of various performance metrics.

A simple performance metric can be a value that is a result of aggregating aspects (e.g., a count, a monetary value, a duration, etc.) of user interaction events across one or more dimensions of the multi-dimensional dataset (e.g., one or more event types, campaign parameters, or parameters characterizing the user interaction events).

For example, a performance metric can be an impression count per advertisement. To derive this performance metric, the collected user interaction data that has an associated event type of "impression" can be selected, and then the selected user interaction data associated with that same advertisement can be aggregated to arrive at the impression count attributable to each of the advertisements. Other examples of performance metrics can be defined, such as click count per ad group, conversion count per keyword, total cost per keyword, average cost per ad group, total revenue per campaign, and so on.

In some implementations, one or more additional selection criteria can be imposed such that only user interaction data that satisfy all of the selection criteria are used to derive the values of the performance metric. For example, the advertiser can request only the impression count per advertisement for a particular time period and a particular geographic region. Therefore, when selecting the user interaction data to derive the impression count per advertisement, only the user interaction data that are associated with a time within the particular time period and a location within the particular geographic region are considered.

The selection criteria for filtering the user interaction data used to derive the performance metrics can include values and/or value ranges of various campaign parameters and parameters characterizing the user interaction events. Examples of the selection criteria can be a particular of keyword matching type (e.g., exact match only), a particular language of the landing page, a range of bid values, or a price range associated with the conversion events, and so on.

In some implementations, more complex performance metrics and selection criteria can be defined based on the various campaign parameters and/or the parameters characterizing the user interaction events. Multiple stages of data selection and/or aggregation may be required in order to derive the values of these more complex performance metrics. In some implementations, the results of the intermediate stages of aggregations can be stored in one or more pre-aggregated datasets, such that the pre-aggregated data can be reused in responding to future requests of the complex performance metrics.

For example, an example conversion-centered performance measure can be an impression-to-conversion path length, and a requested performance metric can be a conversion count per given impression-to-conversion path length. To derive the performance metric for a particular advertiser, a performance analysis apparatus 120 of the advertising management system 110 can first identify the conversion events associated with the advertiser. Then, a conversion path can be constructed for each conversion event. To construct the conversion path for each conversion event, non-conversion user interaction events that are associated with the same advertiser-user pair and that have occurred prior to the conversion event within a given time window are identified and sorted according to their respective timestamps. The chain of non-conversion user events forms the conversion path of the conversion event.

After the conversion path of a conversion event associated with the advertiser has been constructed, the number of non-conversion events in the conversion path can be aggregated to derive an impression-to-conversion path length for the conversion event.

Similar conversion path construction and non-conversion event aggregation can be carried out for each conversion event to derive a respective impression-to-conversion path length for the conversion event. When the impression-to-conversion path lengths for all of the conversion events associated with the advertiser have been determined, conversion events having the same path length can then be aggregated to arrive at the conversion count per given impression-to-conversion path length.

In some implementations, a pre-aggregated dataset including an impression-to-conversion path length dimension and conversion count dimension can be created based on the results of the above example data processing. As additional conversion events become available and the corresponding conversion paths are constructed, the pre-aggregated dataset can be updated using the additional conversion events and their corresponding impression-to-conversion path lengths.

The reports of performance metrics can be prepared based on the user interaction data stored in the advertising data store 119. The performance metrics can be defined by the administrators of the advertising management system 110, or by users of the advertising management system 110. A performance analysis apparatus 120 can store the procedures for calculating each of the performance metrics and can derive the values of the performance metrics based on the selection criteria specified in the advertiser's requests.

In some implementations, the advertising management system 110 may provide user interfaces and APIs for advertisers to define their own performance metrics based on the user interaction data stored in the multidimensional dataset. By allowing the advertisers to define performance metrics that they wish to see, the advertising management system 110 can enable more efficient mining of the user interaction data stored in the advertising data store 119. In addition, the reports provided by the advertising management system 110 can be better tailored to the interest and purpose of each individual advertiser.

The performance analysis apparatus 120 can provide the values derived for the requested performance metrics to the advertising management system 110, and the advertising management system 110 generates data (e.g., a web page resource) that causes presentation of a performance report specifying the requested performance metrics in a reporting user interface.

The performance analysis apparatus 120 can be a distributed network of data processing apparatus that can extract and process the data stored in the advertising data store 119. In some implementations, the advertising data store 119 can include one or more data tables that are implemented according to a distributed data storage model. In some implementations, the designs of the performance analysis apparatus 120 and the advertising data store 119 can be tailored to promote efficient generation of performance metrics that are most frequently requested. More details of the performance analysis apparatus 120 and the advertising data store 119 are described with respect to FIG. 3 to FIG. 6B.

Advertisers can use the performance reports to analyze conversion cycle, conversion paths, how users interact with advertisements that are distributed using various targeting keywords, for example. In turn, each advertiser can make adjustments to campaign parameters that control the distribution of the advertiser's respective advertisements based on the performance reports. For example, the advertiser can specify additional keywords for particular ad groups, increase or lower the bids for particular keywords, replace certain advertisements, extend or shorten the delivery period, change the targeted geographic region and/or budget allocated to different targeted geographic region, and so on.

An Example User Interface for Requesting a Performance Report

Figure 2:
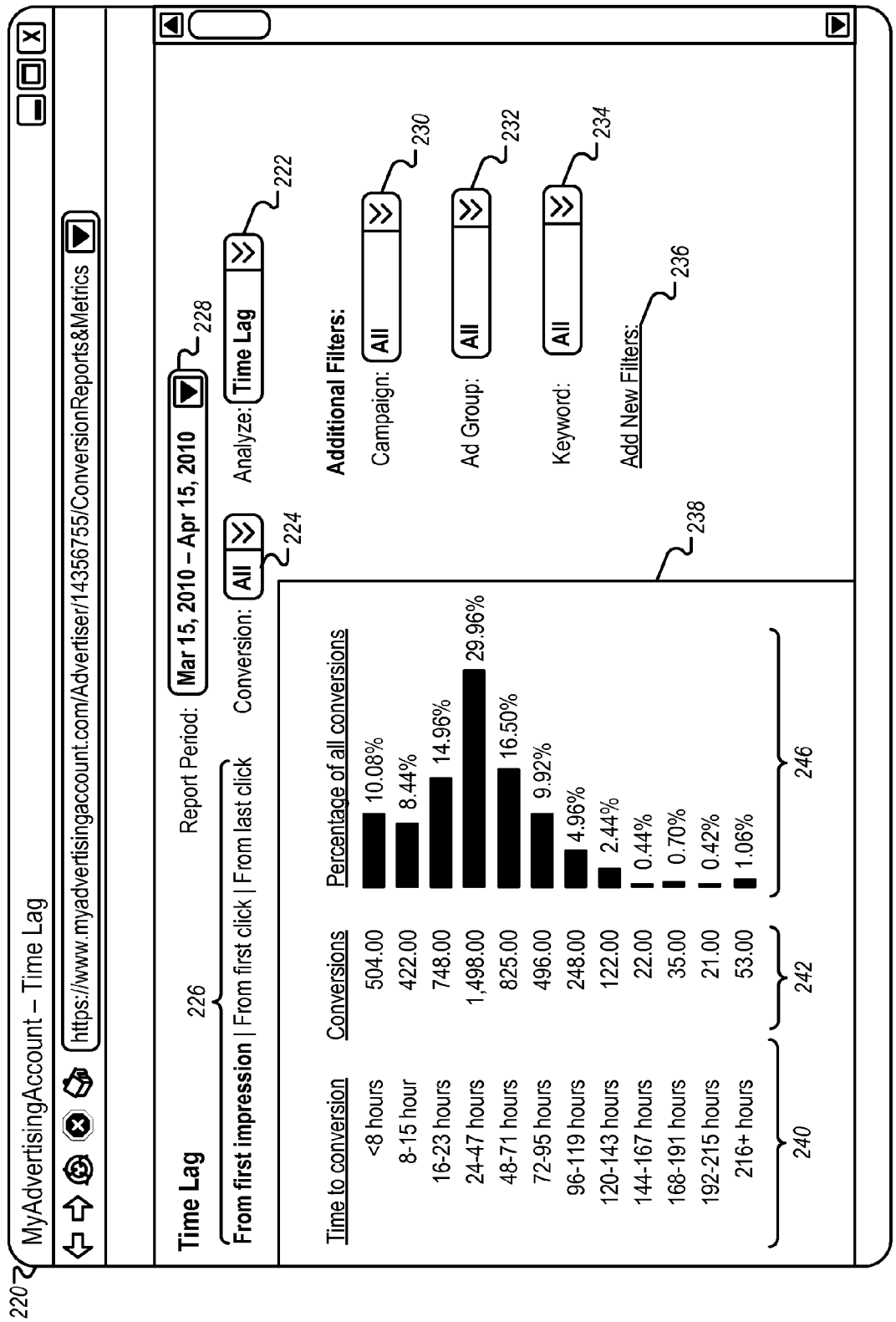
FIG. 2 is an example user interface that displays a performance report based on one or more user-specified criteria.

FIG. 2 is an example user interface 220 that displays information for a performance metric based on a user request. In this example, the performance metric being requested is a respective conversion count for a given impression-to-conversion time lag. An impression-to-conversion time lag represents the duration from an initial impression of an advertisement to the final conversion resulted from the initial impression.

In some implementations, the user interface 220 include one or more user interface elements for a user (e.g., an advertiser) to specify the desire type of performance metric for the performance report. For example, the user interface 220 can include a user interface element 222 that allow the user select a type of basic performance measure for the performance report. The user interface element 222, when invoked, can present a list of available performance measures (e.g., path length, conversion revenue, and so on). As shown in the user interface element 222, the currently selected performance measure is a time lag measure.

The user interface 220 can further include a user interface element 224 that allow the user to further specify that the event of interest is all or a particular type of conversions (e.g, purchase only). As shown in the user interface element 224, the performance metric is currently limited to all conversions.

In addition, the user interface 220 can include a user interface element 226 which allow the user to select a type of reference events (e.g., initial impression, initial click, last click) from which the time lag is measured. As shown in the user interface element 226, the currently selected reference event is the initial impression.

In some implementations, the user interface elements available for specifying the type of performance metric that is being requested may vary depending on the initial selection of a basic performance measure (e.g., a path length, a time lag, etc.).

In addition to user interface elements (e.g., user interface elements 222, 224, and 226) for specifying the type of performance metric that is being requested, the user interface 220 can further include user interface elements for specifying various selection criteria by which user interaction data are selected to derive the type of performance metric that is being requested.

The selection criteria can specify values or value ranges for one or more campaign parameters (e.g., an ad group, a keyword, a keyword match type, a keyword bid, etc.) or parameters characterizing various aspects of the user interaction events (e.g., a time, a geographic location, an event type, and so on). In some implementations, the selection criteria can specify value ranges for additional parameters (e.g., path length, conversion count, total revenue, and so on) that are derived from the collected user interaction data. The parameters that are available as data selection criteria can depend on the dimensions of the datasets that are used to store the user interaction events. In some implementations, the parameters available as data selection criteria can be values derivable from the multidimensional dataset storing the user interaction data.

In this example, the user interface 220 includes a date range selection control 228. The date range selection control 228 allows the user (e.g., the advertiser) to identify a time period for which to display information on the requested performance metric. As shown, the user has selected a month-long period from Mar. 15 to Apr. 15, 2010 for the performance report. Other time ranges can also be specified.

Other user interface elements for entering a respective selection criterion include, for example, a campaign selection control 230, an ad group selection control 232, and a keyword selection control 234. Each of the selection controls 230, 232, and 234 can allow the user to select one or more available parameter values or value ranges for selecting the user interaction data used to derive the requested performance metric.

In some implementations, the user interface 220 includes a user interface element 236 for adding selection controls for additional selection criteria. For example, the user can choose to add a selection control for specifying a minimum conversion value, or a maximum path length for the conversion events being used to derive the impression-to-conversion time lags, and so on.

The user interface 220 can further include a table portion 238 which provides the detailed information of interest (e.g., a report on the requested type of performance metric) within the user interface 220. For example, the table portion 238 can include data values related to the impression-to-conversion time lags. The table portion 238, as depicted using the current settings for various user controls and settings, includes rows of information arranged in three columns. A time lag ranges column 240 (e.g., "Time to conversion") identifies ranges of time lags corresponding to conversions (e.g., less than eight hours, 8-15 hours, 16-23 hours, and so on). A conversion counts column 242 identifies the quantity of conversions that occurred for each of the time lag ranges identified by the time lag ranges column 232. A conversion percentages column 246 identifies the overall percentage (e.g., relative to 100% of the conversions) that each of the conversion ranges represents, on a row-by-row basis in the table portion 238.

Although the example shown in FIG. 2 is given with respect to an conversion count per given impression-to-conversion time lag performance metric, other performance metrics can be requested and displayed. Examples of other performance metrics include conversion counts per ad campaign, impression count per ad group, count of assist clicks per conversion, conversion path length in terms impression, conversion path length in terms of clicks, assisted conversions per ad campaign, and so on. The user interfaces for requesting and displaying the various performance metrics may vary from the user interface 220 displayed in FIG. 2. Other user interface elements for specifying a requested type of performance metric and various selection criteria can be implemented. In addition, user interface elements that adjust the particular manner and format by which the requested performance metric is displayed can also be included.

An Example Backend Data Processing Pipeline

In some implementations, the performance analysis apparatus 120 of the advertising management system 110 can include a front end component and a backend data processing pipeline ("backend pipeline") that facilitate computation and presentation of performance metrics according to user request. Each user request can be processed by the performance analysis apparatus 120 as a query made against a multidimensional dataset storing the user interaction events recorded in the online advertising environment.

Figure 3:
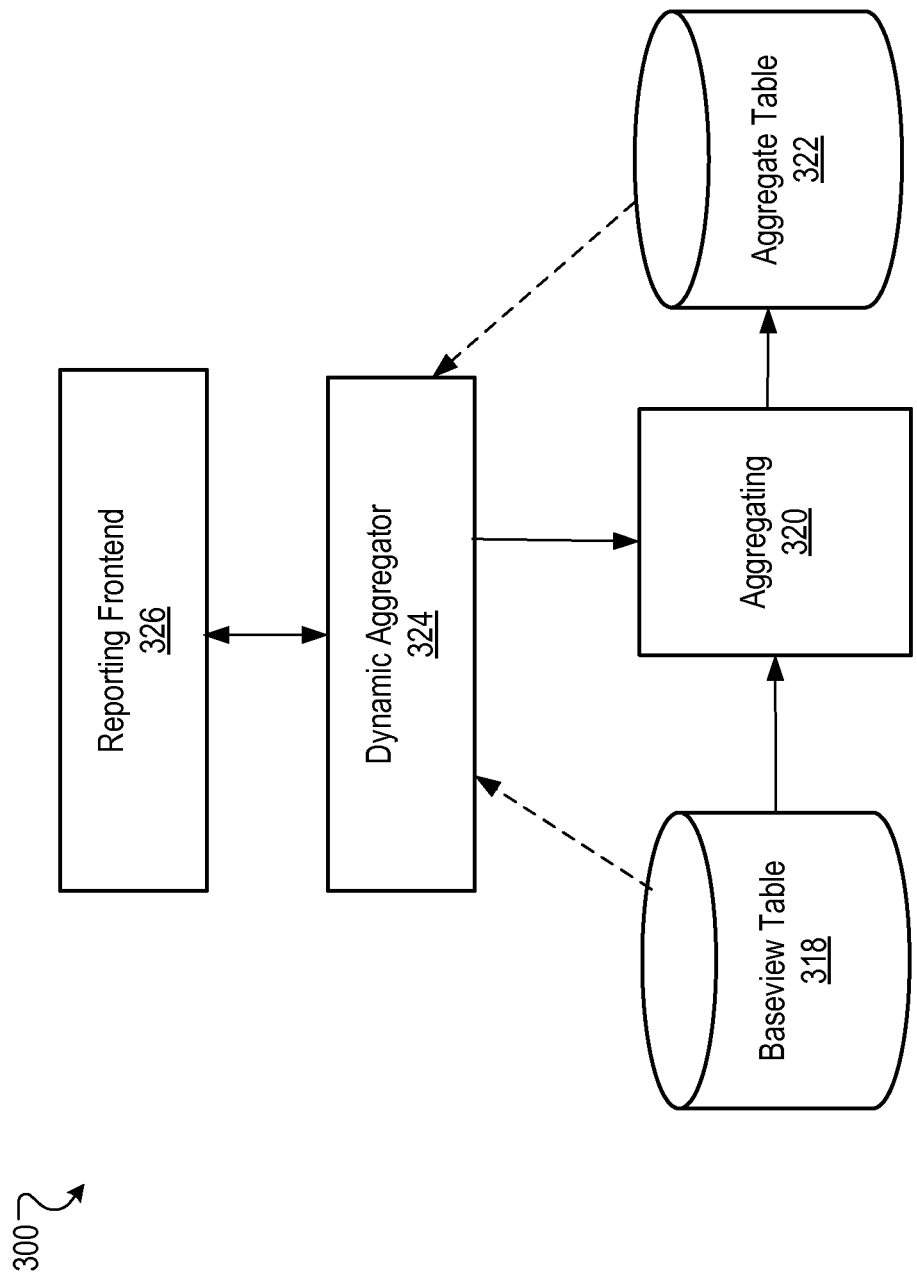
FIG. 3 is an example data processing pipeline for providing performance metrics based on user-specified criteria.

FIG. 3 shows an example backend pipeline 300 through which raw user interaction event data are gathered, augmented, and organized in one or more data tables implemented according to the distributed data storage models described above.

The backend pipeline 300 also includes a dynamic aggregator component 324 that monitors the queries received at the reporting front end 326, and prepares the responses to the queries either directly from data stored in a more complete but less optimized multidimensional dataset, or from data stored in a smaller but more efficient pre-aggregated dataset. The dynamic aggregator component 324 also records the latencies associated with responding to the received queries and the frequencies by which each type of queries have been received. The dynamic aggregator component 324 dynamically generates new pre-aggregated datasets based on the frequencies at which different types of queries have been received and the recorded latencies associated with responding to each type of received queries.

On one end of the processing pipeline 300, a dataset (e.g., a baseview table 318) including a complete set of available user interaction data is continuously updated. To improve the efficiency in generating conversion related performance metrics, a conversion centered data storage model (e.g., a baseview table 318) can be implemented for the baseview table 318. Periodically or at specified times, user interaction date related to new conversions can be added to the baseview table 318.

The baseview table 318 stores the user interaction data grouped (i.e., indexed) by conversions. Each row of the baseview table 318 includes the user interaction data of a conversion and all prior user interactions that occurred within a specified time period prior to the conversion and that are associated with the same advertiser-user pair as the conversion.

In some implementations, a unique conversion identifier is generated for the conversion and used as the row key value for the conversion in the baseview table 318. In some implementations, the conversion identifier includes concatenated string segments representing an advertiser identifier, a conversion type identifier, a date of the conversion, and so on. By generating the row key of the baseview table 318 according to this particular schema, conversions pertaining to the same advertisers can be organized into consecutive rows in the baseview table 318. Similarly, within the consecutive rows of a particular advertiser, conversions of the same type can be organized into consecutive rows as well. Furthermore, conversions of the same type under the same advertiser are also sorted according to their respective dates of occurrence.

By organizing the rows of the baseview table 318 in the above matter, subsections of the baseview table 318 pertaining to individual advertisers, conversion types, and/or date ranges can be distributed among a relatively small number of data servers, and can be extracted and processed in parallel by a distributed system of data processing apparatus. Other schema of the conversion identifier can be implemented to suit various data extraction and processing needs.

In addition, the user interaction data in the baseview table 318 can be correlated with campaign parameter values stored in the advertising database. These advertising parameters can be subsequently used as additional filters or selection criteria to separate out useful subsets of the user interaction data for generating the performance reports of interest to advertisers.

In some implementations, the baseview table 318 includes columns or column families each corresponding to a respective parameter that is associated with the conversion and other user interactions that have occurred within a predetermined time period prior to the conversion. Examples of the parameters can include interaction types such as clicks, impressions, and conversions. In some implementations, conversion type can be subdivided into additional subtypes (e.g., a subtype for purchase, a subtype for sign-up, etc.).

In some implementations, columns or column families corresponding to other parameters associated with the new conversion and other associated user interaction data stored in the same row as the new conversion can be created in the baseview table 318. Examples of such parameters include ad campaign, ad group, keyword, creative, publisher, web address of publisher property, various advertising parameters, and so on.

The conversion centered data in the baseview table 318 can be used to generate conversion related performance reports, such as a time lag report or a path length report as described above. Other conversion related performance metrics can be provided as well. Other types of performance metrics can be generated (e.g., click throughs). Other types of baseview tables can be generated to facilitate efficient generation of other types of metric-centered performance reports, where the center metric of the baseview table can be another type of event (e.g., impressions, clicks, or a particular sub-type of conversions) or parameter data (e.g., campaign, ad group, advertisement, bid value, content network type, and so on) as opposed to conversions.

Although the baseview table 318 includes a large amount of available data from which any number of performance metrics may be derived, the baseview table 318 can be too large and cumbersome to produce reports in a timely manner for some more complex performance metrics or non-conversion related performance metrics. In other words, although the baseview table 318 stores a multidimensional dataset that includes all the necessary data to derive the value for a requested performance metric, the multidimensional dataset may be a sub-optimal dataset for deriving the value for the performance metric as compared to one or more other datasets prepared from the multidimensional dataset.

As a way to improve the response speed for some commonly requested performance metrics, pre-aggregated datasets (e.g., stored in an aggregate table 322) including aggregated values for specific campaign parameters and/or parameters characterizing the context of the user interaction events can be created and maintained. The pre-aggregated datasets (e.g., stored in the aggregate table 322) represent datasets that enable improved performance in responding to particular types of queries made against the multidimensional dataset (e.g., stored in the baseview table 318) as compared to the multidimensional dataset. The pre-aggregated datasets can be optionally stored in a persistent data cache to enable even faster access as compared to the sub-optimal multidimensional dataset.

In some implementations, some of the pre-aggregated datasets can be created according to manual definitions produced by human administrators of the advertising management system 110. In some implementations, the definition of the pre-aggregated datasets can be provided by the dynamic aggregator component 324. An aggregating component 320 can be invoked manually or by the dynamic aggregator 324 generate the pre-aggregated datasets according to the definitions, and store the newly generated pre-aggregated datasets in the aggregate table 322. In some implementations, only one copy of certain aggregated data in the pre-aggregated datasets is stored in the aggregated table 322. The aggregating component 320 can continue to update the aggregate table 322 with new data that have been added to the baseview table 318 and to optionally discard old data to save storage space.

In some implementations, the aggregate table 320 can also be stored in a distributed data model such as the example distributed data model described above. The aggregate table 322 can be indexed by concatenated string segments representing an advertiser identifier and a table type. Other appropriate row key naming schemas for the aggregate table 322 are possible.

In order to efficiently utilize the limited amount of resources available for storing and maintaining the aggregate table 320, a dynamic aggregator component 324 first defines pre-aggregated datasets that would enable improved performance for at least some of the received queries, monitors the potential benefit of the pre-aggregated datasets over a period of time, and selectively generates some of the defined pre-aggregated datasets if the potential benefit of the pre-aggregated dataset outweighs the cost for maintaining the pre-aggregated datasets.

To monitor the potential benefit of each pre-aggregated dataset, the dynamic aggregator 324 can monitor the frequency that an associated type of query is received for which performance improvements can be enabled by the pre-aggregated dataset, and the latencies associated with generating a response based on data directly retrieved from the sub-optimal multidimensional dataset in the baseview table 318. The dynamic aggregator 324 can maintain a benefit score for each pre-aggregated dataset that has been defined but not yet generated, where the benefit score represents a balance between the potential benefit of the pre-aggregated dataset against the potential cost for maintaining the pre-aggregated dataset.

The benefit score for a pre-aggregated dataset can be updated each time a new query of the associated query type is received and the response latency for the query is recorded. When the dynamic aggregator determines that the benefit score of a pre-aggregated dataset indicates that the potential benefit for generating and maintaining the pre-aggregated dataset outweighs the potential cost, the dynamic aggregator can cause the aggregating component 320 to generate the pre-aggregated dataset. The aggregating component 320 can store the generated pre-aggregated dataset in the aggregate table 322 along with other previously generated pre-aggregated datasets.

Specifically, the definition, monitoring, and generation of pre-aggregated dataset can be carried out as follows. The dynamic aggregator component 324 monitors the queries or data request received at the reporting front end 326. Each time when a query is received, the dynamic aggregator 320 determines whether a pre-aggregated dataset suitable for generating the requested type of performance metric is available in the aggregate table 322. If a suitable pre-aggregated dataset is available, the dynamic aggregator 324 generates the performance report using the pre-aggregated data in the pre-aggregated dataset. If a suitable pre-aggregated dataset is not already available in the aggregate table 322, the dynamic aggregator 324 can generate the report from the user interaction data stored in the baseview table 318. The dynamic aggregator 324 then returns the generated report to the front end component 326 for presentation to the requesting user.

When the dynamic aggregator 324 derives the values of the requested performance metric from the baseview table 318, the dynamic aggregator 324 can record a time that was spent on preparing the response using the data retrieved from the baseview table 318. The dynamic aggregator 324 can also records the type of performance metric that was requested. In some implementations, the dynamic aggregator can also record the particular selection criteria that were used to select the user interaction events for deriving the requested performance metric. The recorded information can be used by the dynamic aggregator 324 to define pre-aggregated datasets for each type of received queries and to determine when and whether to generate the pre-aggregated dataset.

In some implementations, the dynamic aggregator 324 can also monitor the latencies associated with generating the performance report using the pre-aggregated data in each pre-aggregated dataset, and the actual cost associated maintaining an existing pre-aggregated dataset, such that actual benefit of an existing pre-aggregated dataset can be weighed against the actual cost associated with maintaining the pre-aggregated dataset. The dynamic aggregator 324 can decide whether to discard an existing pre-aggregated dataset in the aggregate table 322 or split the existing pre-aggregated data table into additional, smaller pre-aggregated datasets when the cost of maintaining the existing pre-aggregated dataset outweighs the benefit of the existing pre-aggregated dataset.

More details of the dynamic aggregator's operations are described with respect to FIGS. 4A-6B. Although a conversion centered data storage model is used to implement the baseview table 318 in the above example, other kinds of multi-dimensional datasets may be used for responding to queries and for generating the aggregated tables 322.

Figure 4A:
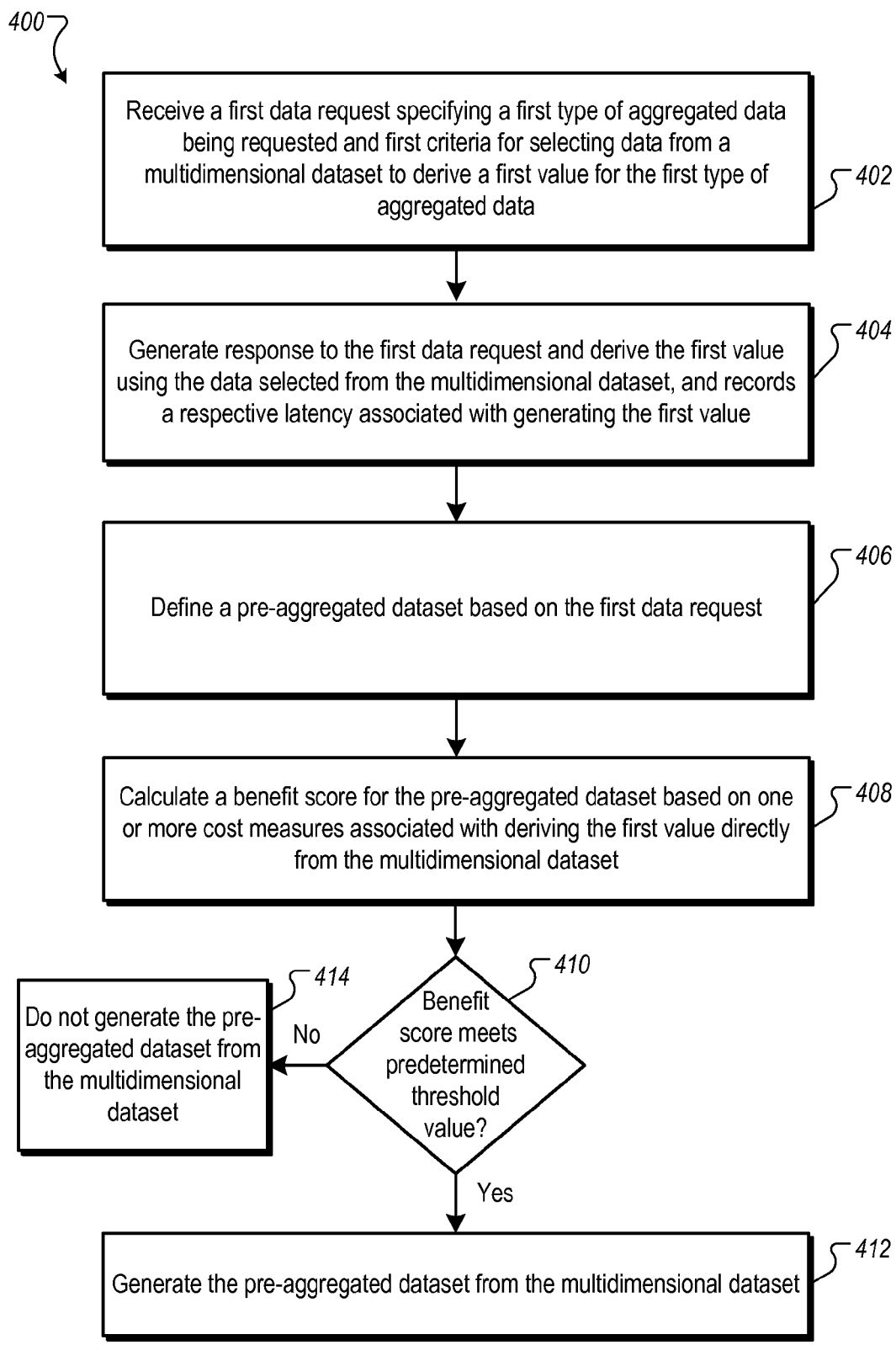
FIG. 4A is a flow diagram of an example process for dynamically generating a pre-aggregated dataset based on real-time monitoring of response time for a user-submitted query.

Example Processes for the Dynamic Configuring and Generating Pre-Aggregated Datasets FIG. 4A is a flow chart of an example process 400 for generating pre-aggregated dataset. A first data request is received from a user device (e.g., through an advertiser's advertising management interface shown in FIG. 2) (402). The first data request specifies a first type of aggregated data being requested and one or more first criteria for selecting data from a multidimensional dataset to derive a first value for the first type of aggregated data. The first type of aggregated data being requested can be an advertising performance metric, for example. The one or more criteria can be one or more selection criteria for selecting data to derive the requested performance metric, for example. The multi-dimensional dataset can be the multidimensional dataset stored in the baseview table 318 or another sub-optimal multidimensional dataset capable of producing the requested data.

Then, a response to the first data request is generated (e.g., by the dynamic aggregator 324) (404). To generate this response, the dynamic aggregator derives the first value for the first type of aggregated data using the data selected from the multidimensional dataset according to the one or more first criteria, and records a respective latency associated with the deriving of the first value.

A pre-aggregated dataset is defined based on the first data request (e.g., by the dynamic aggregator) (406). The pre-aggregated dataset includes pre-aggregated values derived from the multidimensional dataset and enables improved performance in deriving values for the first type of aggregated data as compared to the multi-dimensional dataset.

A benefit score is calculated for the pre-aggregated dataset based on one or more cost measures associated with deriving the first value directly from the multidimensional dataset (408). In some implementations, the one or more cost measures include the recorded latency associated with deriving the first value. In some implementations, the one or more cost measures can be used to calculate a performance improvement measure for the pre-aggregated dataset, and the performance improvement measure can be used to as an input for calculating the benefit score.

Then, it is determined whether the benefit score meets a pre-determined threshold value (410). The pre-determined threshold value can be an empirically determined value. A high benefit score can be used to represent a high desirability to generate the pre-aggregated dataset, while a low benefit score can be used to represent a undesirability to generate and/or maintain the pre-aggregated dataset. When it is determined that the benefit score meets the predetermined threshold value, the pre-aggregated dataset is generated from the multidimensional dataset (412). Otherwise, the pre-aggregated dataset is not generated (414).

In some implementations, the benefit score of the pre-aggregated dataset can be checked from time to time to determine whether the benefit score has met or exceeded the pre-determined threshold value. In some implementations, the benefit score is checked each time it is changed, for example, when a new query associated with the pre-aggregated dataset is received and processed.

In some implementations, other factors can be taken into consideration when deciding whether to generate and/or maintain a particular pre-aggregated dataset. FIG. 4B is an flow diagram of an example process 420 for calculating the benefit score based on both the cost measures associated with not using the pre-aggregated dataset (i.e., directly using the sub-optimal multidimensional dataset), and the cost measures associated with using the pre-aggregated dataset.

In some implementations, when calculating the benefit score for the pre-aggregated dataset, one or more cost measures associated with maintaining the pre-aggregated dataset are also calculated (422). In some implementations, the one or more cost measures associated with maintaining the pre-aggregated dataset includes amounts of resources necessary for storing and maintaining the pre-aggregated dataset. The amount of resources can include the size of the storage space needed to store the pre-aggregated dataset, and the processing power needed to update the pre-aggregated dataset as additional data becomes available in the multidimensional dataset, for example. Other cost measures are possible.

Then, the benefit score for the pre-aggregated dataset is calculated by balancing the one or more cost measures associated with deriving the first value directly from the multidimensional dataset against the one or more cost measures associated with maintaining the pre-aggregated dataset (424).

In some implementations, in addition to recorded latencies, the one or more cost measures associated with deriving the first value directly from the multidimensional dataset further includes a recorded resource usage for deriving the first value. In some implementations, the recorded resource usage can include the processing power used for deriving the first value. As used herein, the cost associated with not using the pre-aggregated dataset can be considered to be directly correlated with the potential benefit for generating and using the pre-aggregated dataset.

In some implementations, the decision on whether to generate and/or maintain a pre-aggregated dataset can also take into consideration the number of queries for which improved response speed can be enabled by the pre-aggregated dataset. FIG. 4C is a flow diagram of an example process 430 for updating the benefit score based on an increase query count associated with the pre-aggregated dataset.

In the process 430, a data request is received (432). The data request specifies a type of aggregated data being requested and one or more criteria for selecting data from the multidimensional dataset to derive a value for the requested type of aggregated data.

When the data request is first received, the dynamic aggregator does not know whether a pre-aggregated dataset suitable for generating response to the data request has already been defined. Accordingly, the dynamic aggregator first determines whether an already defined pre-aggregated dataset would enable improved performance in deriving the value for the requested type of aggregated data as compared to using only the multi-dimensional dataset (434). The determination can be based on the requested type of performance metric specified in the data request and optionally the selection criteria specified in the second data request.

If no pre-aggregated dataset has been defined that would enable improved performance for responding to the data request as compared to the multidimensional dataset, a new pre-aggregated dataset can be defined for the data request and the potential benefit of the newly defined pre-aggregated dataset can be evaluated (436). However, if it is determined that a pre-aggregated dataset has been defined (e.g., the pre-aggregated dataset defined based on one or more previously received data requests), the benefit score for the previously defined pre-aggregated dataset can be increased upon such determination (436).

In some implementations, when the benefit score of the pre-aggregated dataset is increased, the increased benefit score can be compared against the pre-determined threshold, and the pre-aggregated dataset can be generated upon detection that the increased benefit score meets or exceeds the pre-determined threshold value.

Figure 4D:
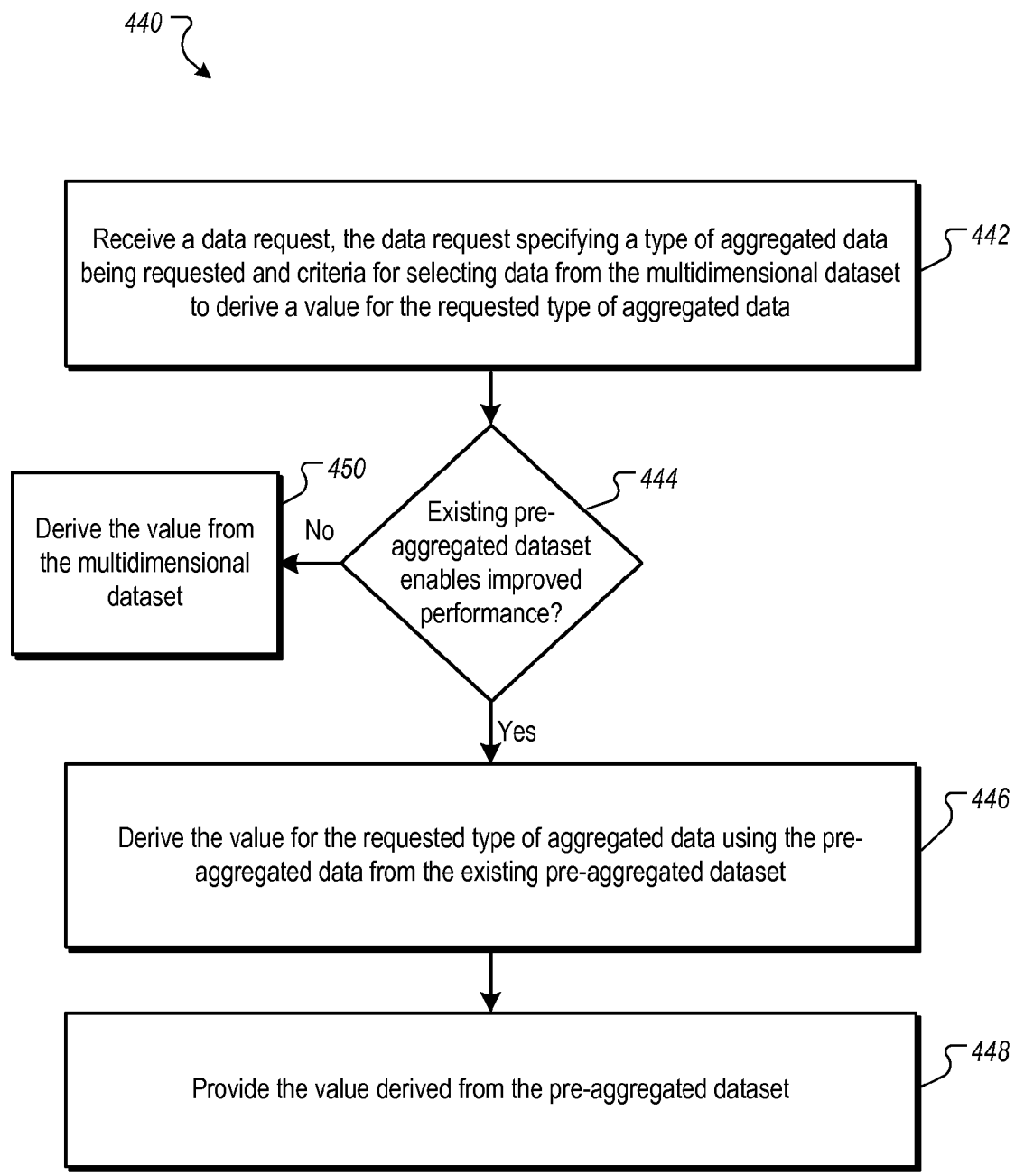
FIG. 4D is a flow diagram of an example process for providing a response to a query made against the multidimensional dataset using data from a pre-aggregated dataset.

FIG. 4D is a flow diagram of an example process 440 for providing a response to a data request based on data from an existing pre-aggregated dataset (e.g., a pre-aggregated dataset already generated and stored in the aggregate table 322 based on one or more prior data requests, or based on manual definition and command by a human administrator).

After generating the pre-aggregated dataset, a data request is received (442). The data request specifies a type of aggregated data being requested and one or more criteria for selecting data from the multidimensional dataset to derive a value for the requested type of aggregated data.

Then, it is determined whether an existing pre-aggregated dataset (e.g., a pre-aggregated dataset that has been generated based on previously received data requests) would enable improved performance in deriving the value for the requested type of aggregated data as compared to the multi-dimensional dataset (444). The value for the requested type of aggregated data can be derived using the pre-aggregated data from the pre-aggregated dataset upon determination that the value for the second type of aggregated data can be derived from the pre-aggregated values in the pre-aggregated dataset (446). Then, the second value derived from the pre-aggregated dataset is provided to a requesting user device (448).

If it is determined that no existing pre-aggregated dataset is suitable for deriving the value for the second type of aggregated data, then the value for the second type of aggregated data can be derived based on data from the sub-optimal multidimensional dataset (e.g., in a baseview table) (450).

Figure 4E:
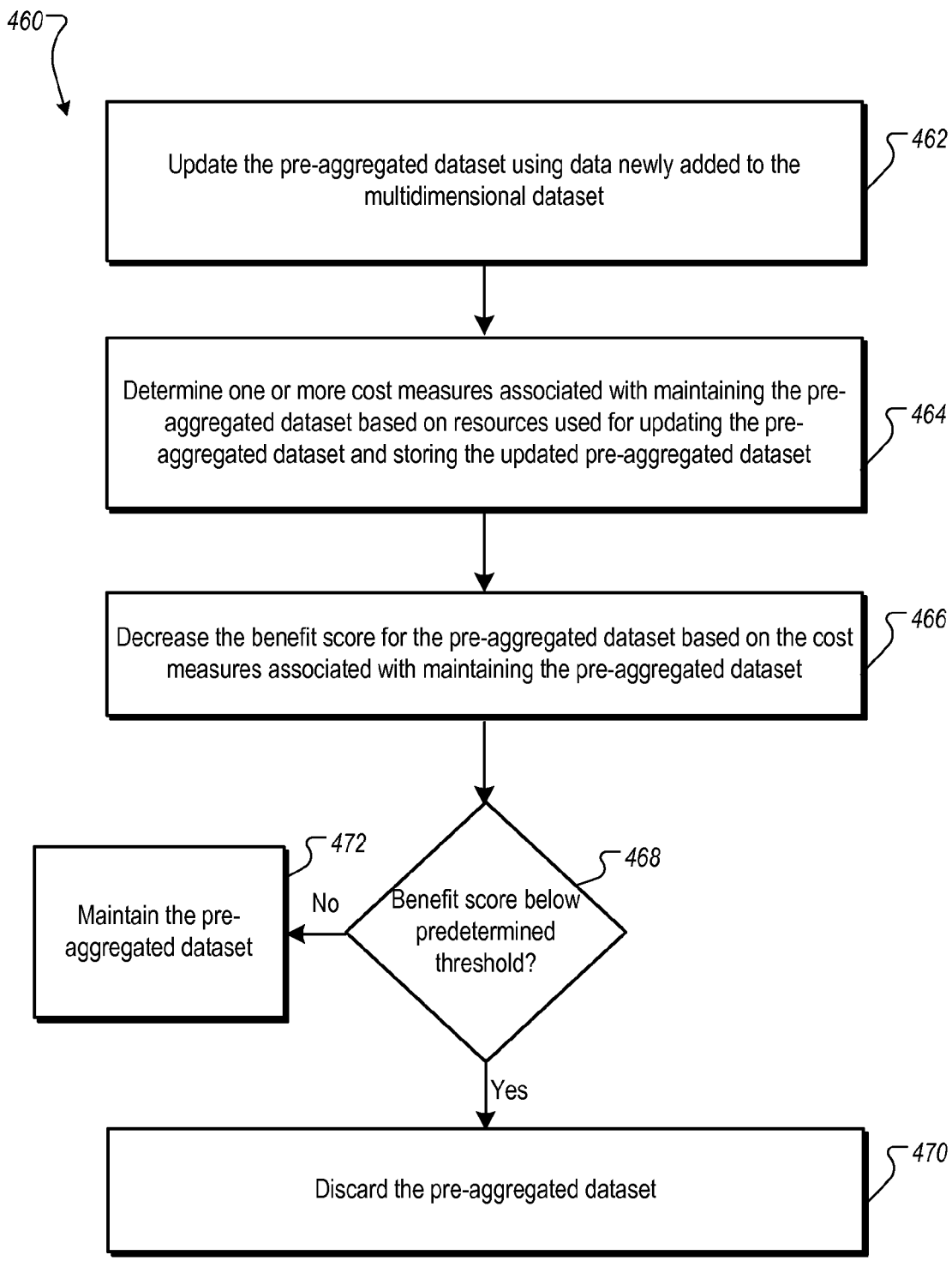
FIG. 4E is a flow diagram of an example process for monitoring the cost of maintaining an existing pre-aggregated dataset.

FIG. 4E is a flow diagram of an example process 460 for monitoring the cost for maintaining an existing pre-aggregated dataset. First, the pre-aggregated dataset is updated using data newly added to the multidimensional dataset (462). The update can be performed periodically, for example.

One or more cost measures associated with maintaining the pre-aggregated dataset are determined based on resources used for updating the pre-aggregated dataset and storing the updated pre-aggregated dataset (464). The resources used for updating the pre-aggregated dataset can include processing resources used to process the new data in the multidimensional dataset and to update the pre-aggregated values in the pre-aggregated dataset. The resources also include the additional storage space that is needed to store the updated pre-aggregated dataset. Other cost measures are possible.

Then, the benefit score for the pre-aggregated dataset is decreased based on the cost measures associated with maintaining the pre-aggregated dataset (466). The dynamic aggregator can check the benefit score of the pre-aggregated dataset from time to time to determine whether the benefit score has dropped below a pre-determined threshold value.

It is determined whether the decreased benefit score has drop below the predetermined threshold value (468). If it is determined that the decreased benefit score has dropped below the pre-determined threshold value, the pre-aggregated dataset is discarded (470). Conversely, the pre-aggregated dataset is maintained (472).

In some implementations, different threshold values can be used for determining whether to generate a pre-aggregated dataset and to discard an existing pre-aggregated dataset, e.g., the threshold value for used for determining whether to generate a pre-aggregated dataset can be higher than the threshold value for determining whether to discard an existing pre-aggregated dataset.

Figure 5A:
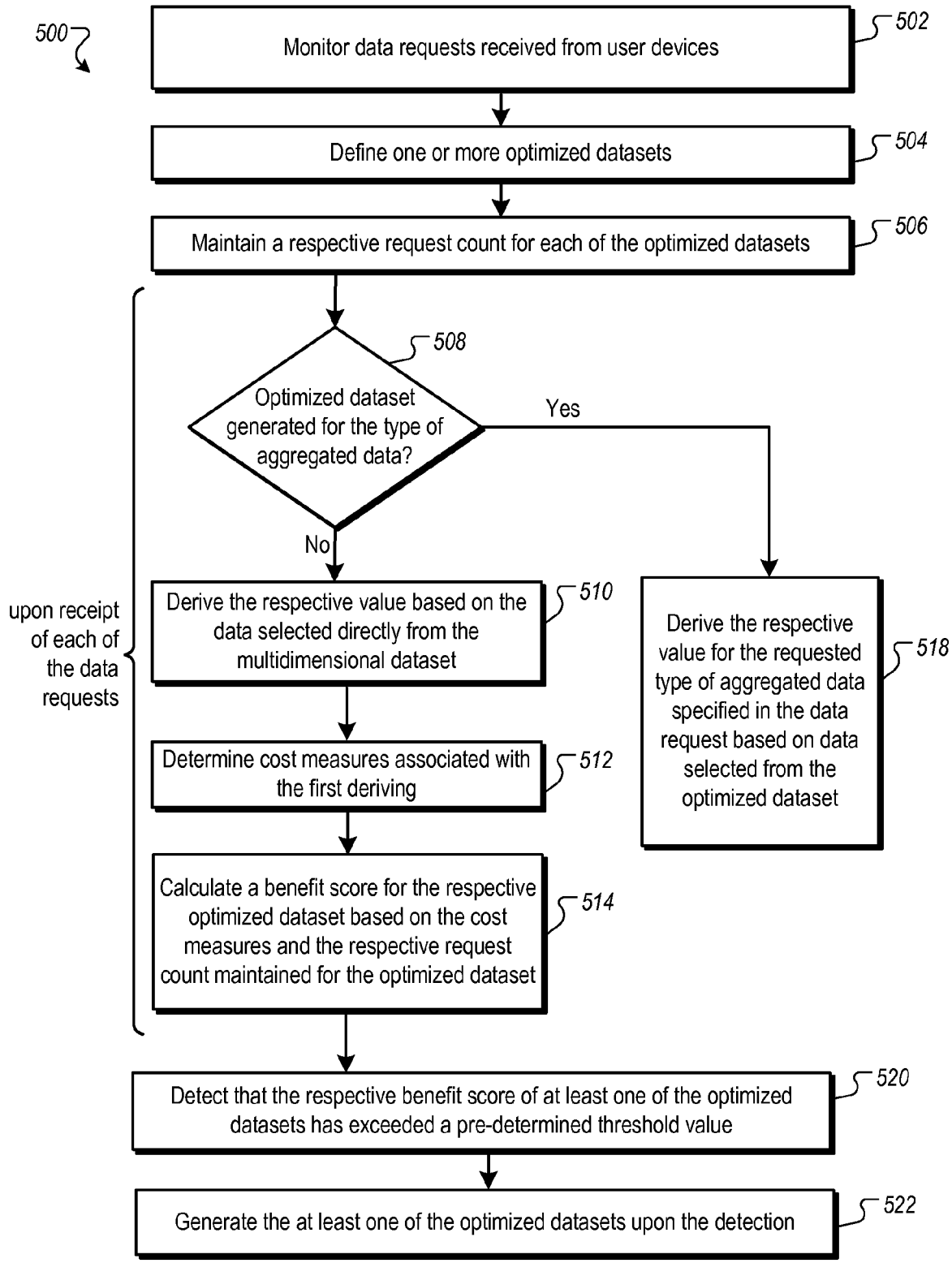
FIG. 5A is a flow diagram of an example process for dynamically generating optimized datasets and responding to queries made against the multidimensional dataset using the optimized datasets.

FIG. 5A is a flow diagram of another example process 500 for dynamically generating optimized datasets (e.g., a pre-aggregated dataset or datasets optimized in another manner (e.g., reorganizing a subset of the multidimensional dataset) to enable efficient response to particular types of data requests) and responding to received data requests.

Data requests received from user devices (e.g., submitted through an advertising management user interface) are monitored (502). Each data request specifying a respective type of aggregated data (e.g., an advertising performance metric) being requested and one or more respective criteria for selecting data from a multidimensional dataset (e.g., the baseview table 318) to derive a respective value for the requested type of aggregated data.

Based on the received data requests, the dynamic aggregator 324 defines one or more optimized datasets (504). Each optimized dataset is adapted for deriving the respective value for the requested type of aggregated data of at least one of the received data requests and enabling improved performance in value derivation for the requested type of aggregated data as compared to the multi-dimensional dataset. The improved performance can be reflected in a faster response time, or a conservation of processing power, for example.

A respective request count is maintained for each of the optimized datasets (506). The respective count tallies the received data requests for which each of the optimized datasets is adapted to provide an improved performance in value derivation as compared to the multidimensional dataset. In some implementations, the request count of at least one optimized dataset is incremented when a new query is received.

Upon receipt of each of the data requests, the dynamic aggregator can decide whether to prepare the response from the sub-optimal multidimensional dataset or from one of the existing optimized datasets.

First, it is determined whether a respective optimized dataset has been generated for the requested type of aggregated data specified in the data request (508). If the respective optimized dataset has not been generated, then, the respective value for the requested type of aggregated data specified in the data request is derived based on the data selected directly from the multidimensional dataset (510), and one or more cost measures associated with deriving the value are determined (512). A benefit score is calculated for the respective optimized dataset based on the one or more cost measures and the respective request count maintained for the optimized dataset (514).

Returning to the decision at 510, if the respective optimized dataset has been generated (YES branch of the decision point 510), the respective value for the requested type of aggregated data specified in the data request is derived based on data selected from the optimized dataset (516).

In some implementations, the dynamic aggregator can monitor the respective benefit score for each of the pre-aggregated dataset, when it is detected that the respective benefit score of at least one of the optimized datasets has exceeded a pre-determined threshold value (520), the at least one of the optimized datasets is generated upon such detection (522).

Figure 5B:
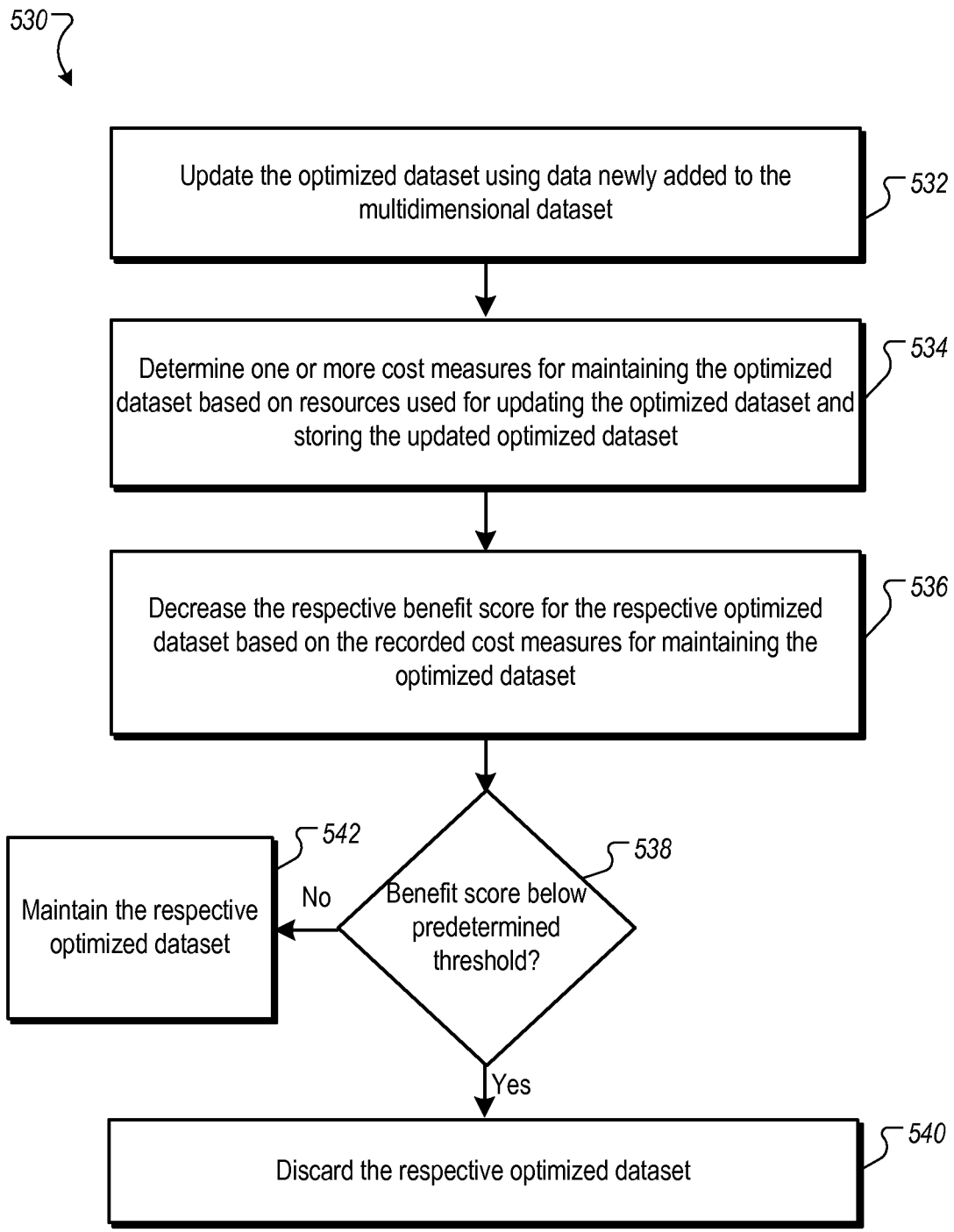
FIG. 5B is a flow diagram of an example process for monitoring the cost of maintaining an existing optimized dataset.

FIG. 5B is a flow diagram of an example process 530 for monitoring the cost for maintaining an existing optimized dataset. In some implementations, for each of the optimized datasets that are already generated, the optimized dataset is updated, for example, periodically, using data newly added to the multidimensional dataset (532).

One or more cost measures for maintaining the optimized dataset are determined based on resources used for updating the optimized dataset and storing the updated optimized dataset (534). In some implementations, the respective benefit score for the respective optimized dataset is decreased based on the recorded cost measures for maintaining the optimized dataset (536). For example, a higher value of the cost can mean a larger decrease in the benefit score. It is determined whether the decreased benefit score is below a predetermined threshold value (538). If it is determined that the decreased benefit score is below the pre-determined threshold value, optionally, the respective optimized dataset can be discarded upon such determination (540). Otherwise, the respective optimized dataset can be maintained (542).

In some implementations, as an existing optimized dataset grows in size and complexity, the response time associated with deriving values from the optimized dataset can grow significantly as well. In addition, the cost associated with maintaining the optimized dataset can also grow substantially. Eventually, the once optimized dataset can become a sub-optimal multidimensional dataset as well. The dynamic aggregator can keep track of the latencies associated deriving values from each existing optimized dataset and the cost for maintaining the existing optimized dataset, and determines when to split the optimized dataset into smaller, more optimized datasets based on the recorded latencies and the cost measures.

In some implementations, the dynamic aggregator can treat this overgrown optimized dataset as a sub-optimal multidimensional dataset, monitor the queries made against the overgrown optimized dataset in terms of sub-query-types and response latencies, and define and generate smaller, more optimized datasets from the overgrown optimized dataset for the sub-types of queries. In some implementations, portions of the overgrown optimized dataset may be discarded when generating the smaller, more optimized datasets.

Figure 5C:
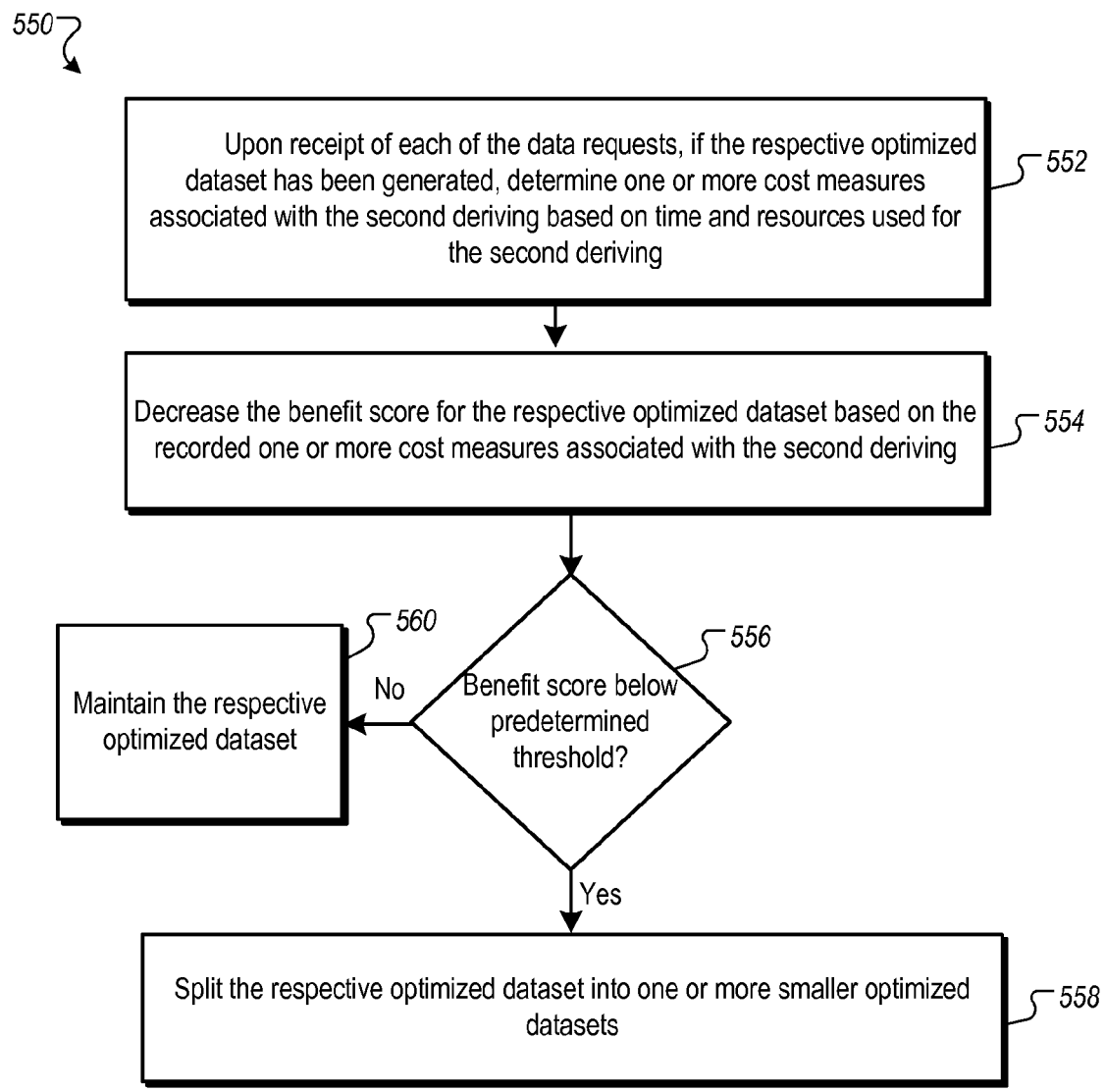
FIG. 5C is a flow diagram of an example process for monitoring the performance of an existing optimized dataset.

FIG. 5C is a flow diagram of an example process 550 for splitting an overgrown optimized dataset. In the example process 550, upon receipt of each of the data requests, if the respective optimized dataset has been generated, one or more cost measures associated with the value derivation for the received data request are determined based on the time and resources used for the value derivation (552). The benefit score for the respective optimized dataset is decreased based on the recorded one or more cost measures associated with the value derivation (554). It is determined whether the decreased benefit score is below a predetermined threshold value (556). If it is determined that the decreased benefit score is below the predetermined threshold, the optimized dataset is split into one or more smaller optimized datasets upon such detection (558). Otherwise, the respective optimized dataset is maintained (560).

Figure 6A:
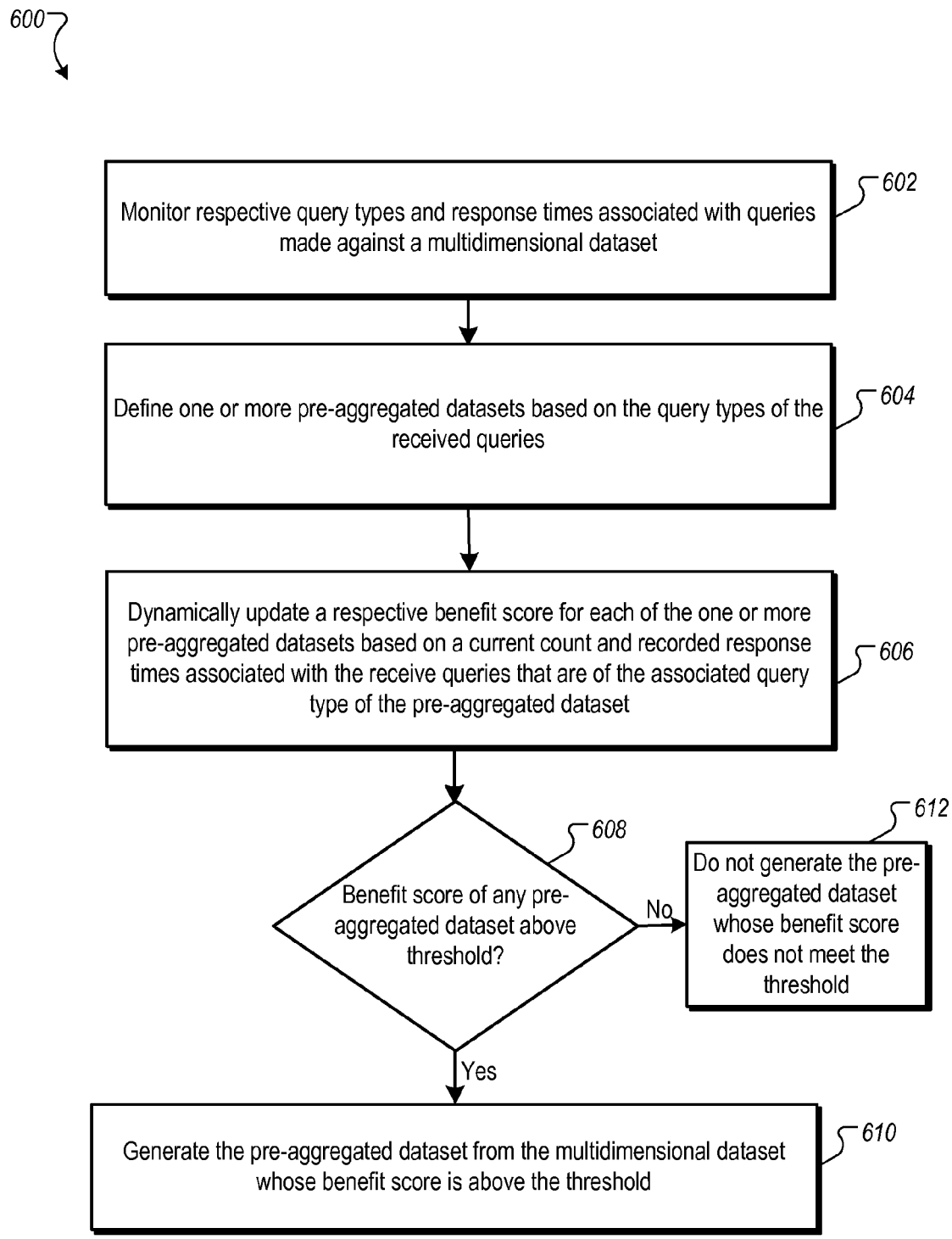
FIG. 6A is a flow diagram of an example process for dynamically generating a pre-aggregated dataset.

FIG. 6A is a flow diagram of another example process 600 for dynamically generating a pre-aggregated dataset. Respective query types and response times associated with queries made against a multidimensional dataset are monitored (602). Each query is from a user of the multidimensional dataset. The user of the multidimensional dataset can be an advertiser, and the multidimensional dataset can be a multidimensional dataset stored according to a conversion centered data storage model, implemented in a distributed data storage system.

One or more pre-aggregated datasets are defined based on the query types of the received queries (604). Each pre-aggregated dataset can include pre-aggregated values derived from the multidimensional dataset and can enable improved response time for an associated query type as compared to the multi-dimensional dataset.

A respective benefit score for each of the one or more pre-aggregated datasets is dynamically updated (606). The update is based on a current count and recorded response times associated with the receive queries that are of the associated query type of the pre-aggregated dataset. It is determined whether the respective benefit score of any of the pre-aggregated dataset meets a predetermined threshold value (608). If it is determined that the benefit score of a pre-aggregated dataset meets the predetermined threshold value, and if the pre-aggregated dataset has not been generated, then, that pre-aggregated dataset is generated from the multidimensional dataset (610). If it is determined that the benefit score of a pre-aggregated dataset does not meet the predetermined threshold value, the pre-aggregated dataset is not generated (612).

In some implementations, in addition to determining when and whether to generate a particular pre-aggregated dataset based on the result of monitoring the query count and response latencies associated with received queries, the dynamic aggregator can also determine an optimal configuration for the pre-aggregated dataset before it is generated. The configuration of the pre-aggregated dataset can be based on an analysis of the queries received at the reporting front end.

Figure 6B:
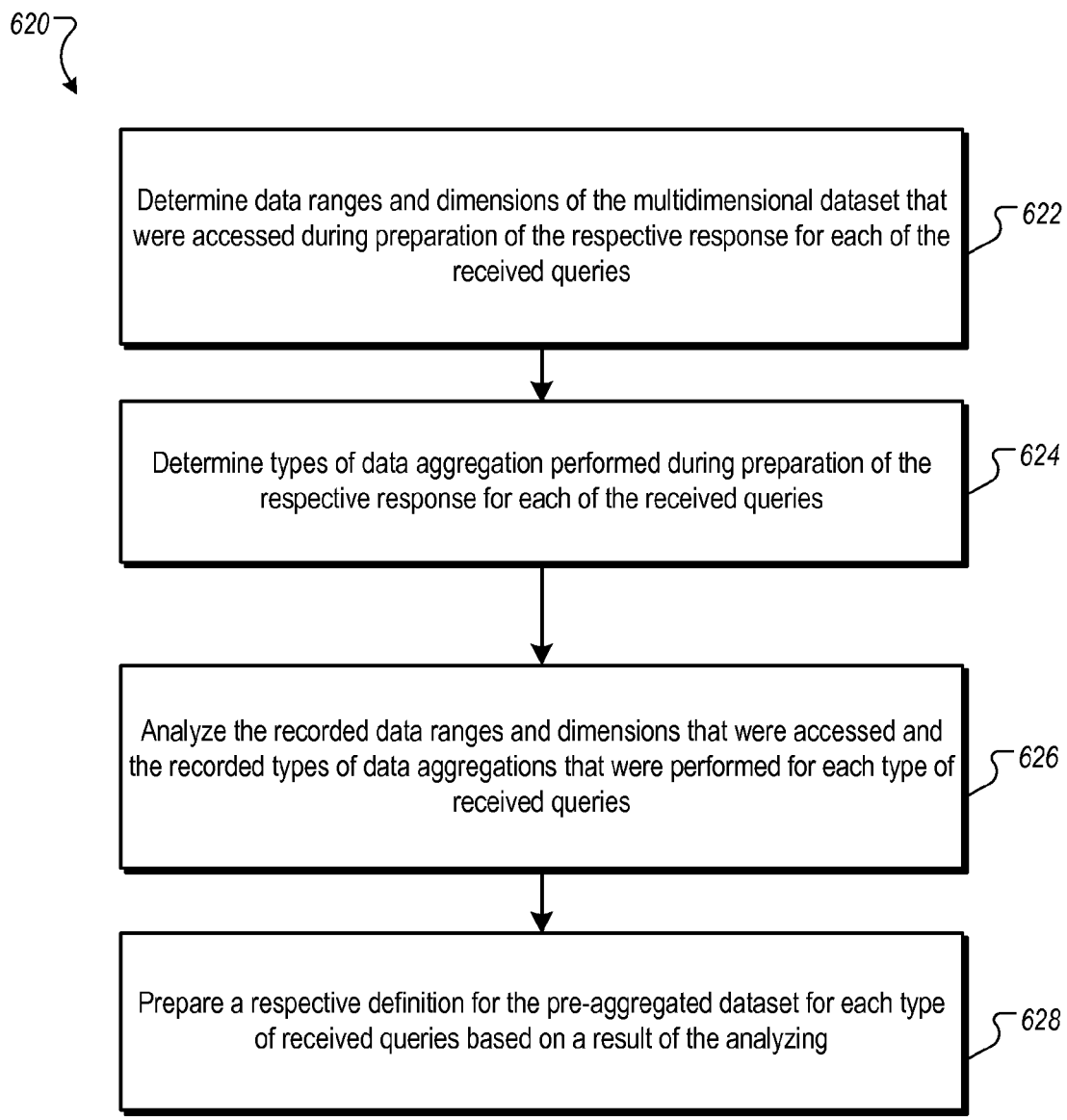
FIG. 6B is a flow diagram of an example process for configuring the pre-aggregated dataset.

FIG. 6B is a flow diagram of an example process 620 for configuring the pre-aggregated dataset based on received queries. When defining the one or more pre-aggregated datasets based on the query types of the received queries, data ranges and dimensions of the multidimensional dataset that were accessed during preparation of the respective response for each of the received queries are determined (612). In addition, types of data aggregation performed during preparation of the respective response for each of the received queries can also determined (614). The determined data ranges and dimensions that were accessed and the recorded types of data aggregations that were performed for each type of received queries are analyzed by the dynamic aggregator, for example, before the pre-aggregated datasets are generated (616). A respective definition for the pre-aggregated dataset for each type of received queries is prepared based on a result of the analyzing (618). The pre-aggregated dataset prepared according to the definition includes values derived using at least some of the recorded types of data aggregation and performed on at least some of the recorded data ranges and dimensions.

In some implementations, each query type specifies a type of performance metric calculated by aggregating data in one or more dimensions of the multidimensional dataset. In some implementations, each query type specifies respective values or value ranges for one or more dimensions of the multidimensional dataset that are used to select data from the multidimensional dataset for calculating a type of performance metric.

Although only a few example performance metrics are referred to in the examples given in this specification, many types of performance metrics can be possible. In some implementations, the type of performance metric includes one of a count of a specified type of user interaction events, a financial value associated with a specified type of user interaction events, and a time value associated with a specified type of user interaction events.

In some implementations, the one or more dimensions includes one or more of an advertiser identifier, a user identifier, an ad campaign identifier, an ad group identifier, a keyword, a creative identifier, a delivery period, a conversion event, a click event, an impression event, a search event, a bid value, a conversion value, and a timestamp. Other performance metrics, dimensions, are possible.

Although several processes for dynamically generating a pre-aggregated/optimized dataset are described, aspects of each process can be applicable and implemented in combination with other processes described herein. Although the examples and processes are given in the context of providing advertising performance metrics, the processes can be implemented in datasets of other data, as well.

Example Data Processing Apparatus

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by one or more data processing apparatus, comprising:
   receiving a first data request from a user device, the first data request specifying a first type of aggregated data being requested and one or more first criteria for selecting data from a multidimensional dataset to derive a first value for the first type of aggregated data;
   responding to the first data request, wherein the responding comprises:
      deriving the first value for the first type of aggregated data using the data selected from the multidimensional dataset according to the one or more first criteria; and
      determining a first latency for responding to the first data request using the multidimensional dataset, the first latency being indicative of an amount of time, after receipt of the first data request, that is required to derive the first value using the multidimensional dataset;
   defining a pre-aggregated dataset based on the first data request, the pre-aggregated dataset, the pre-aggregated dataset being a proper subset of the multidimensional dataset used to derive the first value;
   calculating a benefit score for the pre-aggregated dataset based on a difference between the first latency and a second latency that is indicative of an amount of time required to respond to the first data request using the pre-aggregated dataset;
   determining that the benefit score meets a predetermined threshold value; and
   storing the pre-aggregated dataset from the multidimensional dataset upon determining that the benefit score of the pre-aggregated dataset meets the predetermined threshold value.

2. The method of claim 1, further comprising:
   receiving a second data request, the second data request specifying a type of aggregated data being requested and one or more criteria for selecting data from the multidimensional dataset to derive a value for the type of aggregated data by the second data request;
   determining that using the pre-aggregated dataset to derive the value for the type of aggregated data requested by the second data request lowers a latency for responding to the second data request relative to a latency for responding to the second data request using the multidimensional dataset to derive the value for the type of aggregated data requested by the second data request; and
   increasing the benefit score for the pre-aggregated dataset, in response to determining that using the pre-aggregated dataset to derive the value for the type of aggregated data requested by the second data request lowers the latency for responding to the second data request.

3. The method of claim 2, wherein the determining that the benefit score meets a predetermined threshold value is based on the increased benefit score.

4. The method of claim 1, further comprising:
   after storing the pre-aggregated dataset, receiving a second data request, the second data request specifying a type of aggregated data being requested and one or more criteria for selecting data from the multidimensional dataset to derive a value for the type of aggregated data requested by the second data request;
   determining that using the pre-aggregated dataset to derive the value for the type of aggregated data requested by the second data request lowers a latency for responding to the second data request relative to a latency for responding to the second data request using the multidimensional dataset to derive the value for the type of aggregated data requested by the second data request;
   deriving the value for the type of aggregated data requested by the second data request using the pre-aggregated data from the pre-aggregated dataset; and
   providing the value derived from the pre-aggregated dataset to a requesting user device of the second data request.

5. The method of claim 1, further comprising:
   updating the pre-aggregated dataset using data newly added to the multidimensional dataset;
   determining an amount of resources required for storing and maintaining the pre-aggregated dataset based on resources used for updating the pre-aggregated dataset and storing the updated pre-aggregated dataset; and decreasing the benefit score for the pre-aggregated dataset based on the amount of resources required for storing and maintaining the pre-aggregated dataset.

6. The method of claim 5, further comprising:

determining that the decreased benefit score is below the predetermined threshold value; and discarding the pre-aggregated dataset upon determining that the decreased benefit score is below the predetermined threshold value.

7. A computer-implemented method, comprising:

monitoring data requests received from user devices, each data request specifying a respective type of aggregated data being requested and one or more respective criteria for selecting data from a multidimensional dataset to derive a respective value for the requested type of aggregated data;

based on the received data requests, defining one or more optimized datasets, the optimized datasets being proper subsets of the multidimensional dataset wherein each optimized dataset is defined based on data required to derive the respective value for the type of aggregated data requested by at least one of the received data requests;

upon receipt a data request:

determining that a respective optimized dataset has not been stored for the type of aggregated data being requested by the data request;

in response to determining that the respective optimized dataset has not been stored:

deriving the respective value for the type of aggregated data requested by the data request, the value being derived based on data selected directly from the multidimensional dataset;

determining a first latency, the first latency being indicative of an amount of time, after receipt of the data request, that is required to derive the respective value using the multidimensional dataset; and defining an optimized dataset based on the data request, the optimized dataset being a proper subset of the multidimensional dataset used to derive the respective value; and calculating a benefit score for the optimized dataset based on a difference between the first latency and a second latency that is indicative of an amount of time required to derive the respective value using the optimized dataset, and the respective request count maintained for the respective optimized dataset.

8. The method of claim 7, further comprising:

for each of one or more stored optimized datasets:

updating the optimized dataset using data newly added to the multidimensional dataset;

determining an amount of resources required for storing and for maintaining the optimized dataset based on resources used for updating the optimized dataset and storing the updated optimized dataset;

decreasing the respective benefit score for the respective optimized dataset based on the amount of resources required for storing and for maintaining the optimized dataset;

determining that the decreased benefit score is below a predetermined threshold; and discarding the respective optimized dataset upon determining that the respective benefit score of the optimized dataset is below the predetermined threshold.

9. A computer-implemented method, comprising:

monitoring respective query types and first response times associated with queries made against a multidimensional dataset, each query being received from a user of the multidimensional dataset, a response time being a time interval between receiving a query and providing a response to the query;

for each of one or more query types:

determining, for one or more query types, that pre-aggregated response time resulting from using a pre-aggregated dataset to respond to the query type are lower than the first response time resulting from using the multidimensional dataset to respond to the query type, the pre-aggregated dataset being a proper subset of the multidimensional dataset;

in response to determining that using the pre-aggregated response time is lower than the first response time, storing the pre-aggregated dataset for the query type, the pre-aggregated dataset including pre-aggregated values derived from the multidimensional dataset; and dynamically updating a respective benefit score for each pre-aggregated dataset based on a current count and recorded pre-aggregated response time associated with the queries that are of the associated query type of the pre-aggregated dataset.

10. The method of claim 9, further comprising defining one or more pre-aggregated datasets, wherein defining the one or more pre-aggregated datasets comprises:

recording data ranges and dimensions of the multidimensional dataset that were accessed during preparation of the respective response for each of the received queries;

recording types of data aggregation performed during preparation of the respective response for each of the received queries;

analyzing the recorded data ranges and dimensions that were accessed and the recorded types of data aggregations that were performed for each type of received queries; and preparing a respective definition for the pre-aggregated dataset for each type of received queries based on a result of the analyzing, wherein the pre-aggregated dataset prepared according to the definition including values derived using at least some of the recorded types of data aggregation and performed on at least some of the recorded data ranges and dimensions.

11. The method of claim 9, wherein each query type specifies a type of performance metric calculated by aggregating data in one or more dimensions of the multidimensional dataset.

12. The method of claim 9, wherein each query type specifies respective values or value ranges for one or more dimensions of the multidimensional dataset that are used to select data from the multidimensional dataset for calculating a type of performance metric.

13. The method of claim 12, wherein the type of performance metric includes one of a count of a specified type of user interaction events, a financial value associated with a specified type of user interaction events, and a time value associated with a specified type of user interaction events.

14. The method of claim 13, wherein the one or more dimensions includes one or more of an advertiser identifier, a user identifier, an ad campaign identifier, an ad group identifier, a keyword, a creative identifier, a delivery period, a conversion event, a click event, an impression event, a search event, a bid value, a conversion value, and a timestamp.

15. A computer storage device having instructions stored thereon, the instructions, when executed by one or more processors, cause the processors to perform operations comprising:

receiving a first data request from a user device, the first data request specifying a first type of aggregated data being requested and one or more first criteria for selecting data from a multidimensional dataset to derive a first value for the first type of aggregated data;

responding to the first data request, wherein the responding comprises:

deriving the first value for the first type of aggregated data using the data selected from the multidimensional dataset according to the one or more first criteria; and determining a first latency, the first latency being indicative of an amount of time, after receipt of the first data request, that is required to derive the first value using the multidimensional dataset;

defining a pre-aggregated dataset based on the first data request, the pre-aggregated dataset being a proper subset of the multidimensional dataset used to derive the first value;

calculating a benefit score for the pre-aggregated dataset based on a difference between the first latency and a second latency that is indicative of an amount of time required to respond to the first data request using the pre-aggregated dataset;

determining that the benefit score meets a predetermined threshold value; and storing the pre-aggregated dataset from the multidimensional dataset upon determining that the benefit score of the pre-aggregated dataset meets the predetermined threshold value.

16. A system, comprising:

one or more processors; and memory coupled to the one or more processors and having instructions stored thereon, the instructions, when executed by the one or more processors, cause the one or more processors to perform operations comprising:

receiving a first data request from a user device, the first data request specifying a first type of aggregated data being requested and one or more first criteria for selecting data from a multidimensional dataset to derive a first value for the first type of aggregated data;

responding to the first data request, wherein the responding comprises:

deriving the first value for the first type of aggregated data using the data selected from the multidimensional dataset according to the one or more first criteria; and determining a first latency for responding to the first data request using the multidimensional dataset, the first latency being indicative of an amount of time, after receipt of the first data request, that is required to derive the first value using the multidimensional dataset;

defining a pre-aggregated dataset based on the first data request, the pre-aggregated dataset being a proper subset of the multidimensional dataset used to derive the first value;

calculating a benefit score for the pre-aggregated dataset based on a difference between the first latency and a second latency that is indicative of an amount of time required to respond to the first data request using the pre-aggregated dataset;

determining that the benefit score meets a predetermined threshold value; and storing the pre-aggregated dataset from the multidimensional dataset upon determining that the benefit score of the pre-aggregated dataset meets the predetermined threshold value.

17. A non-transitory computer-readable medium having instructions stored thereon, the instructions, when executed by one or more processors, cause the one or more processors to perform operations comprising:

monitoring data requests received from user devices, each data request specifying a respective type of aggregated data being requested and one or more respective criteria for selecting data from a multidimensional dataset to derive a respective value for the type of aggregated data requested;

based on the received data requests, defining, by a processor, one or more optimized datasets, the optimized datasets being proper subsets of the multidimensional data set each adapted for deriving the respective value for the type of aggregated data requested by at least one of the received data requests;

maintaining a respective request count for each of the optimized datasets, the respective count tallying the received data requests for which the optimized dataset is adapted to provide improved performance in value derivation as compared to the multidimensional dataset;

upon receipt of each of the data requests:

determining whether a respective optimized dataset has been generated for the type of aggregated data requested by the data request;

if the respective optimized dataset has not been generated:

deriving the respective value for the type of aggregated data requested by the data request based on the data selected directly from the multidimensional dataset;

determining, by a processor, a first latency for responding to the data request using the multidimensional dataset, the latency being indicative of an amount of time, after receipt of the first data request, that is required to derive the first value using the multidimensional dataset; and calculating, by a processor, a benefit score for the respective optimized dataset based on a difference between the first latency and a second, latency that is indicative of an amount of time required to respond to the first data request using the respective optimized dataset and the respective request count maintained for the respective optimized dataset.

18. A system, comprising:

one or more processors; and memory coupled to the one or more processors and having instructions stored thereon, the instructions, when executed by the one or more processors, cause the one or more processors to perform operations comprising:

monitoring data requests received from user devices, each data request specifying a respective type of aggregated data being requested and one or more respective criteria for selecting data from a multidimensional dataset to derive a respective value for the requested type of aggregated data;

based on the received data requests, defining one or more optimized datasets, the optimized datasets being proper subsets of the multidimensional data set each adapted for deriving the respective value for the type of aggregated data requested by at least one of the received data requests;

maintaining a respective request count for each of the optimized datasets, the respective count tallying the received data requests for which the optimized dataset is adapted to provide improved performance in value derivation as compared to the multidimensional dataset;

upon receipt of each of the data requests:
  determining that a respective optimized dataset has not been stored for the type of aggregated data being requested by the data request;
  in response to determining that the respective optimized dataset has not been stored:
    deriving the respective value for the type of aggregated data requested by the data request, the value being derived based on data selected directly from the multidimensional dataset;
    determining a first latency, the first latency being indicative of an amount of time, after receipt of the data request, that is required to derive the respective value using the multidimensional dataset; and
    defining an optimized dataset based on the data request, the optimized dataset being a proper subset of the multidimensional dataset used to derive the respective value; and
    calculating a benefit score for the optimized dataset based on a difference between the first latency and a second latency that is indicative of an amount of time required to derive the respective value using the optimized dataset, and the respective request count maintained for the optimized dataset.

* * * * *

UNITED STATES PATENT AND TRADEMARK OFFICE
CERTIFICATE OF CORRECTION

PATENT NO. : 8,521,774 B1
APPLICATION NO. : 12/860328
DATED : August 27, 2013
INVENTOR(S) : Chao Cai et al.

Page 1 of 1

It is certified that error appears in the above-identified patent and that said Letters Patent is hereby corrected as shown below:

Title Page, Column 2, item 56, Line 1 – below "OTHER PUBLICATIONS" insert -- Notification of Transmittal of the International Search Report and the Written Opinion of the International Searching Authority, or the Declaration for PCT/US2010/054923 mailed on August 2, 2011, 11 pages. --.

In the Claims

Claim 17, Column 32, Line 48 – delete "second," and insert -- second --, therefor.

Signed and Sealed this
Tenth Day of December, 2013

Margaret A. Focarino
*Commissioner for Patents of the United States Patent and Trademark Office*